United States Patent [19]
Thebaud

[11] Patent Number: 5,909,501
[45] Date of Patent: Jun. 1, 1999

[54] SYSTEMS AND METHODS WITH IDENTITY VERIFICATION BY COMPARISON AND INTERPRETATION OF SKIN PATTERNS SUCH AS FINGERPRINTS

[75] Inventor: Lawrence R. Thebaud, Agoura Hills, Calif.

[73] Assignee: Areté Associates, Sherman Oaks, Calif.

[21] Appl. No.: 08/709,302

[22] Filed: Sep. 9, 1996

[51] Int. Cl.[6] .................................................. G06K 9/00
[52] U.S. Cl. ........................................ 382/124; 382/209
[58] Field of Search .................................. 382/115, 116, 382/124, 125, 190, 191, 201, 206, 209, 254, 260, 275; 356/71; 340/825.34

[56] References Cited

U.S. PATENT DOCUMENTS

| | | | |
|---|---|---|---|
| 4,641,350 | 2/1987 | Bunn | 382/124 |
| 4,811,414 | 3/1989 | Fishbine et al. | 382/272 |
| 4,956,870 | 9/1990 | Hara | 382/124 |
| 5,040,223 | 8/1991 | Kamiya et al. | 382/127 |
| 5,715,325 | 2/1998 | Bang et al. | 382/209 |

*Primary Examiner*—Leo H. Boudreau
*Assistant Examiner*—Bhavesh Mehta
*Attorney, Agent, or Firm*—Ashen & Lippman

[57] ABSTRACT

Preferably a sensor receives a print image from an authorized person to form a template, and from a candidate to form test data. Noise variance is estimated from the test data as a function of position in the image, and used to weight the importance of comparison with the template at each position. Test data are multilevel, and are bandpassed and normalized—and expressed as local sinusoids—for comparison. A ridge spacing and direction map of the template is stored as vector wavenumber fields, which are later used to refine comparison. Global dilation—and also differential distortions—of the test image are estimated, and taken into account in the comparison. Comparison yields a test statistic that is the ratio, or log of the ratio, of the likelihoods of obtaining the test image assuming that it respectively was, and was not, formed by an authorized user. The test statistic is compared with a threshold value, preselected for a desired level of certainty, to make the verification decision—which controls access to a utilization system such as facilities, equipment, a financial service, or a system for providing or receiving information. Certain forms of the invention also encompass the utilization system. Nonvolatile memory holds instructions for automatic operation as described above.

27 Claims, 6 Drawing Sheets

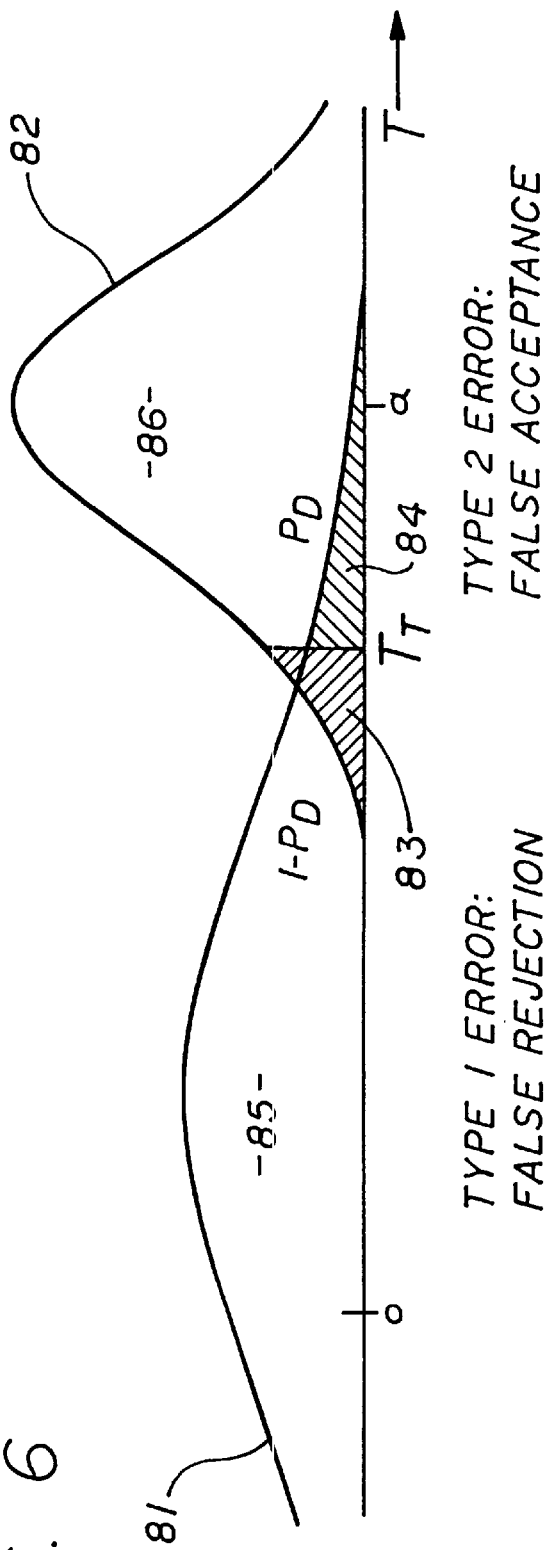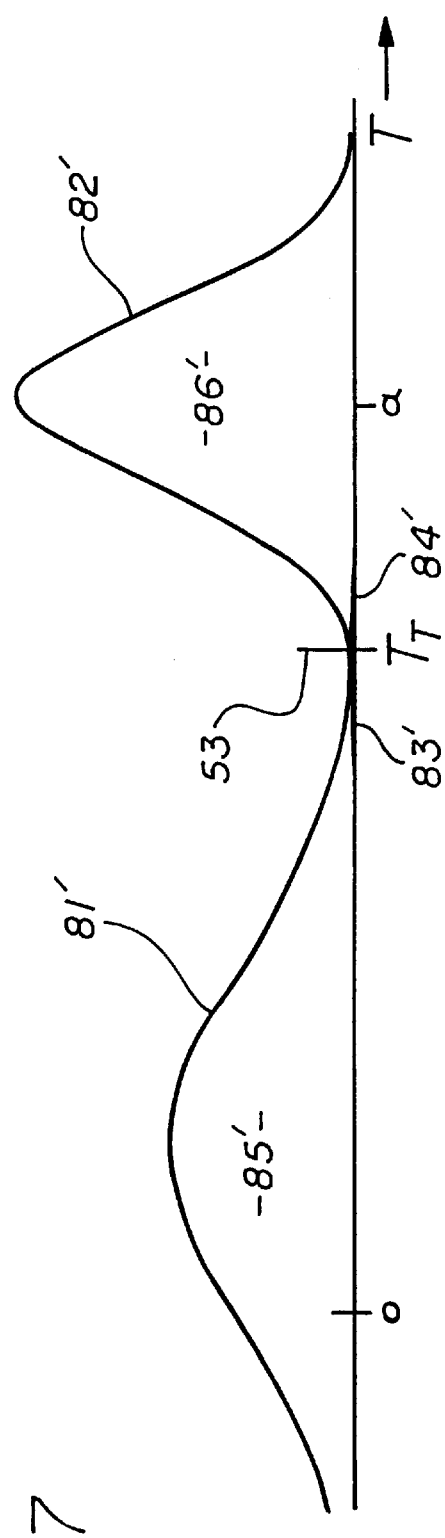

SYSTEMS AND METHODS WITH IDENTITY VERIFICATION BY COMPARISON AND INTERPRETATION OF SKIN PATTERNS SUCH AS FINGERPRINTS

RELATED U. S. PATENT APPLICATIONS

Two coowned, copending applications are related: Ser. No. 08/382,220 of J. Kent Bowker and Stephen C. Lubard, Ph. D., filed Jan. 31, 1995, and issued Sep. 22, 1998, U.S. Pat. No. 5,812,252; and attorney docket xAA-15, filed generally concurrently herewith on Sep. 9, 1996, of J. Kent Bowker et al., and entitled "ECONOMICAL SKIN-PATTERN-ACQUISITION APPARATUS FOR ACCESS CONTROL; SYSTEMS CONTROLLED THEREBY", later made Ser. No. 08/709,785, status pending. Both applications are wholly incorporated by reference into the present document.

FIELD OF THE INVENTION

This invention relates generally to systems and methods for verifying identity of people, by comparison and interpretation of skin patterns such as fingerprints; and more particularly to novel firmware and software stored in apparatus memories, as portions of apparatus, for interpreting such patterns and controlling utilization devices. With respect to certain of the appended claims, the invention further relates to systems that include such utilization devices.

A utilization device is, for example, a facility, apparatus, means for providing a financial service, or means for providing information. The phrase "utilization device" thus encompasses, but is not limited to, businesses, homes, vehicles, automatic teller machines, time-and-attendance systems, database-searching services, and a great many other practical systems. An apparatus memory for such storage is, for example, a programmable read-only memory ("PROM"), or a computer-readable disc.

BACKGROUND OF THE INVENTION

Classical methods for evaluation of fingerprints. toeprints, palmprints and like skin patterns entail location, categorization and tabulation of minutiae. Efforts to adapt these classical techniques for automated print verification have received great attention and elaboration, but are fundamentally limited by their sensitivity to measurement noise at the location of the miniutiae.

Automated analysis based on minutiae also is inherently very dependent on image enhancement—which often breaks down when initial data quality is marginal. For these reasons some workers have explored other methodologies.

Some seemingly promising efforts employ holograms—either direct three-dimensional images of prints, or holographic Fourier transforms (which have the advantage of being position invariant). Some of these techniques, for best results, impose costly demands on special memory devices for storing the holograms. These holographic correlators are in essence modern refinements of much earlier two-dimensional direct-optical-overlay correlators such as that described by Green and Halasz in U.S. Pat. No. 3,928,842.

An intermediate ground is represented by a few relatively sophisticated patents that use digital computers to (1) automatically select one or more distinctive small regions—not necessarily minutiae—in a master print or "template", and then (2) automatically look for one or more of these selected small regions in a print provided by a person who purports to be the maker of the template. These earlier patents particularly include U.S. Pat. Nos. 5,067,162 of Driscoll, 5,040,223 of Kamiya, 4,982,439 of Castelaz, 4,805,223 of Denyer, and 4,803,734 of Onishi.

All of these latter patents describe making final verification decisions based upon such comparisons of small regions. In this they are unavoidably flawed in their excessive dependence upon isolated, small amounts of data—more specifically, very small fractions of the available information in a candidate user's print.

Some of the patents in the above list do describe sound techniques for one or another part of their respective processes. Some workers, such as Driscoll and Kamiya, use correlation methods (but electronic-data correlation methods, not optical correlation methods) to choose the small reference sections in the enrollment process—i. e., in forming the template—and also in comparison of those regions with features in a candidate user's print. Denyer similarly uses an approximation to such correlation technique.

These patents do generally allow for the possibility that the authorized user's template may be shifted, or in other words translated, in placement of the print image on the sensor. Some (particularly Driscoll and Denyer) allow for the possibility that the template may be rotated too.

Driscoll discusses finding a least-squares-fit between plural reference regions and a potentially corresponding plurality of test regions in the candidate print. He suggests that departures from an ideal rotated pattern of the reference regions is to be accounted for by distortion of the fingertip in the course of placement on a sensor, but by his least-squares approach also suggests that such distortion is inherently "random" in the sense of lacking internal correlation. whereas distortions of flesh-and-skin structures are in fact random in the sense of being modeled or modelable statistically, proper efforts at such modeling must take into account that neighboring portions of the structure exert influences upon one another, resulting in physical correlations. In short, neighbors are softly constrained.

Driscoll's approach, in using a least-squares fit—to accommodate departures from a rigid rotation that underlies the distortion—in essence disregards such correlations; at best, he only considers a small part of the operative statistics. Denyer, too, briefly mentions (though in a much more generalized and tangential way) the possibility of somehow accounting for distortion.

All of these patents, however, fail to take account of dilations (or, to put it more completely, dilations or contractions) which an authorized user's fingertip may undergo—relative to the same user's established template. Such dilations may arise from variations in the pressure with which the finger is applied to an optical or other sensor (capacitive, variable-resistance etc.).

Such dilations may be expected to have at least a component which is invariant across the entire image, in other words a dilation without change of fingerprint shape—an isomorphic dilation. Furthermore all the above-mentioned patents fail to make systematic, controlled allowance for dilations and other forms of distortion that are differential—which is to say, nonisomorphic.

Correlation methods, matched-filter methods, and (loosely speaking) related overlay-style techniques of comparison all fail totally in any area where a reference print is mismatched to a candidate print by as little as a quarter of the spacing between ridges. I have found that dilations and other distortions can and commonly do produce spurious mismatches locally—over sizable areas—exceeding twice the spacing between ridges, that is, many times the minimum disruption which destroys correlation and thereby recognition.

Therefore, failure to account properly for either dilation (isomorphic distortion) or distortion differential distortion) results in unacceptably high rates of failure to verify or recognize an authorized user—i. e., high rates of the so-called "false rejection" or "type 1 error". Artificial measures aimed at reducing this failure rate lead inevitably to the converse: unacceptably high rates of failure to reject unauthorized users, impostors—i. e., high rates of the so-called "false acceptance" or "type 2 error".

Merely allowing for some distortion, in a statistically uncontrolled way, can never cure this fundamental failing. Skin and flesh distortion does not affect prints in an uncorrelated way, but rather in partially systematic ways that arise from the physical character of skin and flesh. I believe that failure to account properly for distortion is the single greatest contributor to poor performance of fingerprint verifying systems heretofore.

Furthermore variations in habits of placement of a fingertip on a sensor tend to be somewhat systematic. These systematic properties of the print-forming process have their own statistically characteristic patterns—their own statistics.

In the context of any given comparison method, these special statistics exert particular characteristic effects on the results. All the patents mentioned above appear to ignore these statistics, in the process discarding very important information that bears strongly on verification decisions.

In addition, the patents listed above fail to make use of modern principles of decision theory and signal processing that have been used to great advantage in other fields. Driscoll, for instance, while discussing the final stages of his analysis in terms reminiscent of the established Neyman-Pierson analysis, does not appear to properly apply the principles of that analysis. Such principles have been importantly applied in industrial, military, and scientific pattern-recognition problems, but workers in the practical fingerprint field do not appear to be aware of these principles or in any event are not evidently using them.

Similarly none of the patents noted makes use of decisional downweighting of data from areas that are less certain or noisier; rather, to the extent that any consideration at all is given to such matters, noisy data are simply discarded—a very undesirable way to treat expensive data. Bandpassing of test data is not seen in these references, although certain other forms of filtering are used by Driscoll and others. Normalizing is likewise absent—except for trivial forms implicit in binarization or trinarization, used in many print analyzers. None of the noted patents teaches expression of test and template data, or comparison of such data with one another, in terms of local sinusoids.

Thus the skin-pattern verification field has failed to make good use of all available data, take effective account of dilations or distortions, make suitable allowance for known statistics of placement variation, and apply modern decisional and signal-processing tools. As can now be seen, the prior art in this field remains subject to significant problems, and the efforts outlined above—although praiseworthy—have left room for considerable improvement.

SUMMARY OF THE DISCLOSURE

The present invention introduces such improvement, and performs fingerprint verifications with an outstandingly high accuracy not available heretofore. The invention has several facets or aspects which are usable independently—although for greatest enjoyment of their benefits I prefer to use them together, and although they do have several elements in common. The common parts will be described first.

In its preferred apparatus embodiments, the present invention is apparatus for verifying the identity of a person. It operates by comparing (1) test data representing a two-dimensional test image of that person's skin-pattern print with (2) reference data derived from a two-dimensional reference skin-pattern print image obtained during a prior enrollment procedure. Each of the apparatus embodiments includes some means for holding instructions for automatic operation of the other elements of the apparatus; these instruction-holding means include or make use of a nonvolatile memory device, and may be termed the "nonvolatile memory means".

Now in preferred embodiments of a first of its independent aspects, the apparatus includes some means for extracting from the test data an estimate of noise variance in the test data. For purposes of breadth and generality in expression of the invention, these means will be called simply the "extracting means"; they extract a noise-variance estimate as a function of position in the test image.

The apparatus of this first facet of the invention also includes some means for comparing portions of the test and reference data, for corresponding positions in the two images. Once again for generality and breadth these means will be called the "comparing means".

In addition the apparatus includes some means for weighting the importance of comparison for each portion. These means—again the "weighting means"—weight the importance of comparison for each portion in accordance with the noise-variance estimate for the corresponding position.

Also included are some means, responsive to the weighting means, for making an identity-verification decision—identified here as the "decision-making means".

The foregoing may be a description or definition of the first facet or aspect of the present invention in its broadest or most general terms. Even in such general or broad form, however, as can now be seen the first aspect of the invention significantly contributes to resolving the previously outlined problems of the prior art. In particular, the use of downweighting for noisier regions of a print is a major step toward enabling use of essentially all available data.

All of the apparatus forms of the invention are preferably practiced incorporating some sensor means for acquiring the test data, and some means, responsive to the decisionmaking means, for operating a switch. Thus the invention provides a practical real-world system, not an abstraction.

Now turning to a second of the independent facets or aspects of the invention: in preferred embodiments of this second facet, the invention apparatus includes some means for deriving from the test data corresponding multilevel test data that are bandpassed and normalized. For reasons suggested earlier these means may be denoted the "deriving means".

For the purposes of this document the term "normalize" is to be understood as describing a true stretching (or compression) of the dynamic range of data to a standard range—while maintaining multilevel character of the data. This normalization thus is understood to be beyond the trivial forms seen in prior-art binarization and trinarization, which force all data to be only binary or at most trinary.

This apparatus also has comparing means related to those described above for the first aspect—but here the comparing means are for comparing portions of the bandpassed and normalized multilevel test data with the reference data. In addition it has decision-making means, also related to those described earlier—but here the decision-making means are responsive to the comparing means.

The foregoing may constitute a definition or description of the second facet or aspect of the present invention in its broadest or most general terms. Even in such general or broad form, however, as can now be seen the second aspect of the invention resolves the previously outlined problems of the prior art.

In particular such an apparatus by taking advantage of signal-enhancing techniques of bandpassing and normalization the invention improves both actual signal-to-noise relations and effective signal-to-noise relations in the system, in terms of best use of the available data-handling capability.

These advantages have not heretofore been enjoyed by skin-pattern verification systems. In this way this second facet of the invention too leads toward greater precision and accuracy in verifying prints.

In a third of its independent facets, the invention apparatus includes means for expressing the test data in the form of local sinusoids, and means for expressing the reference data in the form of local sinusoids. The apparatus also includes comparing means—but here the comparing means compare portions of the sinusoidally expressed test data with the sinusoidally expressed reference data.

Decision-making means are also included, responsive to the comparing means as just defined. By operating on the data in sinusoidal form the invention in preferred embodiments of this third aspect is able to exploit many advanced signal-processing techniques, particularly including the Fast Fourier Transform (FFT), multiplicative operations in the frequency domain in lieu of convolutions in the spatial domain, back-transformations to find spatial results etc.—each of which saves a great amount of computational time and effort without loss of accuracy.

While optical Fourier transforms have been applied in holographic fingerprint systems, as mentioned earlier, neither sinusoidal representations nor Fourier treatment of digital data has heretofore been used in this field.

Preferred apparatus embodiments of the invention in a fourth of its independent facets include some means for deriving from the reference data a map of ridge spacing and direction. These deriving means also store the map as one or more vector wavenumber fields.

Further included are some means for comparing portions of the test data with the reference data; these comparing means include means for using the vector wavenumber fields to refine the comparing operation. The apparatus also includes decision-making means responsive to these comparing means.

While some earlier systems do make one or another type of ridge map, typical earlier uses proceed to direct comparison of the maps. None stores the map in the form of a vector wavenumber field for later use in refining a discrete comparing operation.

This aspect of the invention enables several extremely effective uses of the ridge spacing and direction data in adjustments of the authorized-user template for fairer comparison with a candidate user's fingerprint. Such advantages will be more clearly seen in later sections of this document.

Apparatus of preferred embodiments according to a fifth independent aspect or facet of the invention includes some means for estimating the assumed dilation of the test image relative to a reference image—i. e., "dilation-estimating means". The dilation here mentioned is to be understood as having a global character—in other words, affecting the entire print uniformly, without change of shape. The dilation-estimating means thus estimate isomorphic dilation.

The apparatus also includes means for comparing the test data with the reference data, taking into account the estimated dilation. The apparatus also includes decision-making means that respond to these comparing means.

This facet of the invention too advances the art meaningfully as it enables two major operating improvements. The first of these is finding small regions of a candidate-user print that correspond to selected distinctive regions of the authorized-user template—even in the presence of dilations that would otherwise destroy the correlation and so impair recognition.

The second major operating improvement attributable to this fifth independent aspect of the invention is particularly efficient operation of a more-general distortion-estimating aspect of the invention that will be described below. My global-dilation evaluating feature gives the later distortion estimator a running start, in that the distortion estimator need seek only the spatially differential part of the overall distortion—perturbations, in other words, of the global, isomorphic dilation.

Apparatus according to a sixth independent aspect of the invention includes some means for estimating an assumed distortion of the test image relative to a reference image. Here the distortion under discussion particularly includes nonisomorphic distortion.

As will be understood, however, the distortion here mentioned typically also includes an isomorphic component—to the extent that previous detection of and accounting for isomorphic dilation was imperfect, or perhaps was not provided at all. The apparatus also includes means for comparing the test data with the reference data, taking into account the estimated distortion; and decision-making means responsive to these comparing means.

Although all the independent aspects and facets of my invention make extremely important contributions to excellent performance of my invention, the distortion-estimating means resolve the root cause of what I consider the greatest single defect in prior systems. As suggested earlier, it is this defect that especially impairs the ability of prior systems to reliably recognize an authorized user—i. e., to recognize a clear, clean template which has simply been slightly distorted.

In particular the estimation of distortion enables application of the estimated distortion to approximately equalize the test and reference data with respect to the assumed distortion. The comparing means can then compare the thus-approximately-equalized test and reference data.

This can be done particularly straightforwardly, by using the estimated distortion to generate a matched filter for use in forming a test statistic. In both the filter generation and the actual use of the test statistic thereby formed, the system can readily be made to take into account estimated noise variance in the test data, as a function of position in the test image.

The distortion adjustment underlies and enables all such refinements. The result is an overall level of excellence in recognition of templates, even in the presence of unusual distortions—leading in turn to truly extraordinary low error rates of both the "false rejection" and "false acceptance" types.

Details of operation of the distortion-estimating means—including demodulation of the test data, smoothing, downsampling and then a cautiously expanding gradient search for the assumed distortion field, to avoid loss of phase registration—will all be presented below.

In a seventh of its independent facets or aspects, preferred apparatus embodiments of the invention include some means for comparing the test data with the reference data to form a test statistic as the ratio, or logarithm of the ratio, of the likelihoods of two contrary hypotheses:

likelihood of obtaining the test image, assuming that the candidate user is the same person who also formed the reference fingerprint image (template), and likelihood of obtaining the test image, assuming that a different person formed the reference print image.

This apparatus also includes decision-making means responsive to the test statistic.

This aspect of the invention thus for the first time in the fingerprint field makes proper use of established principles of decision theory. Print verifications are thereby placed on a sound footing that actually leads to the most conclusive decision that can justifiably be made from the available information—no more, no less.

Fingerprint-based verifications of identity have long suffered from an absence of such sound operation. Advantageously my comparison means are combined with means for comparing the test statistic with a threshold value, preselected to impose a desired level of certainty in verification.

Preferred apparatus embodiments of yet an eighth independent facet or aspect of my invention diverge somewhat from the first seven. The apparatus here is for receiving surfacerelief data from a sensor that acquires surface-relief data from a relieved surface such as a finger—and in response controlling access to facilities, equipment, a financial service, or a system for providing or receiving information.

The apparatus is for use in the presence of an assumed dilation of the relieved surface. The apparatus includes a system for processing the received data to determine identity of the relieved surface. In addition to the previously mentioned instruction-holding memory means, this system includes:

means for analyzing the data to estimate the assumed dilation, means for comparing the test data with reference data, taking into account the estimated dilation, and means, responsive to the comparing means, for making an identity-verification decision.

In addition, the overall apparatus includes some means for applying the determined identity to control access to such fa3 cilities, equipment, financial service, or source or reception of information. Thus this aspect of the invention, while spe5 cifically incorporating the dilation-estimating feature men6 tioned above in connection with the fifth independent aspect, particularly focuses on and includes, as part of the inven8 tion, components that actually control access to various types of utilization means.

A ninth independent facet of the invention involves a further divergence, in that it is a secured system subject to access control based upon surface-relief data from a relieved surface such as a finger. This system is for use in the presence of an assumed distortion of the relieved surface.

The system includes utilization means, susceptible to misuse in the absence of a particular such relieved surface that is related to an authorized user. The utilization means being selected from the group consisting of:

a facility, apparatus, means for providing a financial service, and means for providing or receiving information.

In addition the system includes sensor means for acquiring surface-relief data from such a relieved surface.

The system also includes some means for processing the data to determine identity of the relieved surface, and for applying the determined identity to control access to the utilization means. These processing and applying means include, in addition to the instruction-holding memory means:

means for analyzing the data to estimate the assumed distortion, means for comparing the test data with reference data related to the particular relieved surface related to the authorized user, taking into account the estimated distortion, and means, responsive to the comparing means, for making an identity-verification decision.

Thus this aspect of the invention includes the utilization means themselves, as well as the access-control intermediary that is included in the eighth aspect of the invention.

While thus focusing on and including the utilization means, the invention makes use of the distortion-estimating feature discussed earlier in connection with the sixth independent facet of the invention.

In a tenth of its independent aspects or facets, preferred embodiments of the invention take the form of a method, rather than apparatus. This method is for verifying the identity of a person. The method does so by comparing test data representing a two-dimensional test image of that person's skin-pattern print with reference data derived from a two-dimensional reference skin-pattern print image obtained during a prior enrollment procedure.

The method includes the step of extracting from the test data an estimate of noise variance in the test data as a function of position in the test image. It also includes the step of comparing portions of the test and reference data, for corresponding positions in the two images.

Furthermore the method includes the steps of weighting the importance of comparison for each portion, in accordance with the noise-variance estimate for the corresponding position; and—responsive to the weighting means—making an identity-verification decision. Another step is, in non-volatile memory, holding instructions for automatic operation of the foregoing steps.

Thus the method partakes of the advantageousness of the noise-weighting apparatus embodiments of the first independent aspect of the invention, discussed earlier. Preferably this method is optimized by incorporation of other features or characteristics, particularly the steps of operating a sensor to acquire the test data and—responsive to the decision-making step—operating a switch if identity is verified.

All of the foregoing operational principles and advantages of the present invention will be more fully appreciated upon consideration of the following detailed description, with reference to the appended drawings, of which:

BRIEF DESCRIPTION OF THE DRAWINGS

FIG. 6 is a graph or diagram showing relationships of a very general representative "test statistic";

FIG. 7 is a like view for a test statistic 52 of FIG. 1, in accordance with the present invention; and FIG. 8 is an overall block diagram showing the embodiment of my invention in a hardware system.

DETAILED DESCRIPTION OF THE PREFERRED EMODIMENTS

Figure 1:
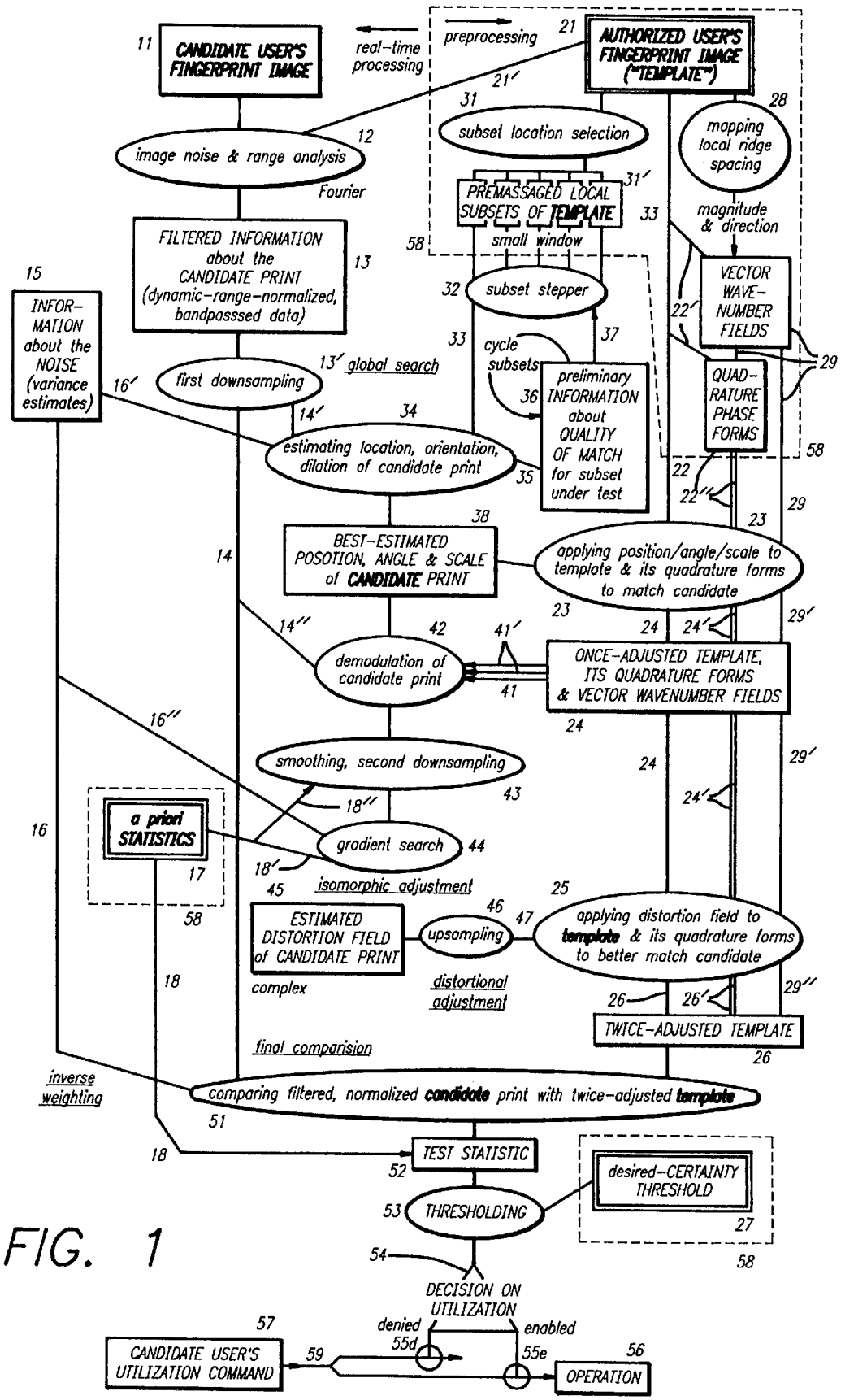
FIG. 1 is a flow chart or block diagram showing, for certain preferred embodiments of my invention, how different portions of the programmed firmware perform the processes of the invention.

Inputs—As FIG. 1 shows, preferred embodiments have at least three groups of inputs: one group of inputs from the candidate user of a weapon or other apparatus, another from the authorized user (or that person's surrogates), and the third from generalized population data. The candidate's inputs include a fingerprint-image data array 11 and a command 57 (at bottom left in the drawing) that the apparatus operate. The data array 11 originates from a skin-pattern detector, which is most representatively an optical sensor array but may instead be of another type such as capacitive, variable-resistive or high-frequency acoustic.

The authorized user's inputs include a fingerprint-image data array 21 (originating analogously to the array 11 for the candidate user, discussed above), and a parameter setting 27 which reflects the desired certainty with which a fingerprint match must be found. The authorized user does not necessarily personally enter this parameter 27 into the system, but may instead indicate a selection of the value, or acquiesce in the value, of this parameter.

The desired-certainty threshold parameter 27 is related to the relative numbers of false positives and false negatives to be tolerated—but not in an arithmetically direct way, rather in complicated statistical ways as will be explained in further detail later in this document. For this reason, a more precisely correct name for this threshold parameter 27 might be more abstract, e. g. "decision threshold"; however, the phrase "desired-certainty threshold" may be more helpful as it is more descriptive.

This value is selected to reflect the type of usage anticipated. In particular, it can be related to the probability of false negatives, so that it could be thought of as controlling the "desired certainty" of acceptance for the authorized user. Alternatively, the desired-certainty threshold old can be inversely related to the probability of false positives, and thus thought of as controlling (but in an inverse way) the desired certainty of rejection for an unauthorized user.

For example, if the apparatus is to control access to an advance-fee-based gymnasium, the primary objective may be merely to discourage occasional cheaters. In this case the certainty of acceptance for the prepaid customer or member of the gym may be set very high—accepting a significant chance of letting in someone who has not paid.

Similarly if the apparatus is a weapon to be used in the field by military or police personnel, a primary objective may be to have use of the weapon available to the authorized user without delay and without question. In this case the certainty level may be set relatively high—accepting some small chance that the weapon might be usable by an opponent who takes it from the authorized user. In this case, however, since there are significant risks associated with an opponent's appropriation of a weapon, the authorized-user acceptance likelihood might not be set quite as high as in the first example above where the adverse consequences of admitting a cheater are minor.

Now in a contrary example, for control of access to a secure area containing documents or apparatus of utmost sensitivity, a primary objective may be to exclude spies. In this case the certainty level for acceptance of authorized personnel may be set distinctly low—accepting some significant likelihood that an authorized individual may be delayed in entry by having to repeat the verification procedure.

Similarly if the apparatus is a weapon to be kept in a home for protection against intruders, a primary objective may be to prevent unauthorized use by children or teenagers who live or visit in the home. In this case the certainty level may be set relatively low—accepting some small degree of unreliability in the weapon's availability for use against intruders—but perhaps not as low as in the immediately preceding example, since delayed availability of a weapon to an authorized user in an emergency is ordinarily much more onerous than delayed entry to a secure area.

A third type of input is a statistical set 17 preferably coming from neither the candidate user nor the authorized user, but rather from a generalized database representing people in general. Since these data are ordinarily derived without reference to the particular people known to be involved, I call these data "prior statistics" or "a priori statistics".

The statistical data 17 are applied 18, 18" at certain points in the processing to take into account the known degree of variability in the way people place their fingers on a fingerprint-acquisition imaging device. This variability may differ depending on the position and orientation of the imaging device in relation to the user.

For example, variability in a panel-mounted imager at an automatic teller machine may be expected to have a statistical pattern that is different from variability in a desktop imager in an office. Variability in an imager that is built into a tool (e.g., a weapon) may be expected to be different still.

In some cases, particularly where a user typically is standing while applying a fingertip to a stationarily mounted imaging device, this variability may depend in part upon the height of the user. In any event it is preferable to collect a different a priori data set using the actual type of imager and collection geometry for which a particular apparatus will be used.

In special cases, initial data acquisition may show that the authorized user's fingerprints have very unusual properties or characteristics. In such extraordinary cases better performance may result from using a statistical set 17 derived from input data 21 for the authorized user.

Such provisions require a lengthier procedure for enrollment or registration of the authorized user, to establish not only this user's fingerprint but also certain measures of the variability in this user's presentation of the print to the apparatus. For good results, furthermore, such a procedure should be deferred until the authorized user has acquired some familiarity with the apparatus, which intrinsically tends to lead toward habits of handling—and thereby not only to reduced variability but also to particular patterns of variability.

Such extra effort might possibly be justified in special cases, as for instance with a person who has an injury or a handicap that affects the posture or the attitude of the arm or hand. Another possible special situation perhaps may occur when a person of very unusually short stature, or a person in a wheelchair, will be placing a fingerprint on a device to operate an automatic teller machine where most users stand. Such special problems of stature, etc., if they prove signifi7 cant may be best managed by assembling height-correlated and other specially correlated statistics.

In general the use of a priori statistics, ideally collected from users who have already formed habits in placing fingers on imagers, appears preferable.

Procedural overview—A glance at the bold vertical lines 14, 22 in FIG. 1 reveals that the fundamental scheme is to direct signals 12–14 from the candidate fingerprint image data 11, and signals 22–26 representing the authorized user's preprocessed fingerprint image data or "template" 21, to a common final comparison 51. Certain side calculations or signal paths 15–16, 28–47 along the way facilitate and enhance the comparison.

Results 52–56 of the comparison 51 interact with signals 59 generated by the candidate's command 57—in a manner controlled by the desired-certainty threshold 27—to determine whether the command 57 produces no perceptible action at all φ, or produces operation 56. (The invention encompasses including a no-function warning light or tone, rather no perceptible action, if utilization is denied 55d.) Preliminary processing of the candidate's data—Processing of the candidate image data 11 begins with analysis 12 of the dynamic range of signals which represent grooves and ridges within the image. The result includes forming a new image-data version 13, in which this dynamic range is normalized, i. e. locally stretched or compressed to precisely match the overall range of the later processing stages.

In addition the new version of the image is subjected to Fourier analysis—expressing the data as spatial sinusoids— and bandpass filtering, to eliminate inappropriate spatial frequencies in the image version 13. In the analysis 12, preferably spatial frequencies are treated as "inappropriate" if they are not spatial frequencies 21' that could have originated from the similarly preprocessed print (template) 21 of the authorized user.

Preprocessing of the authorized user's print to obtain the template will be described shortly. In such original preprocessing, spatial frequencies can be rejected based on a more leisurely harmonic-content analysis of the authorized user's print.

Closely associated with the range analysis 12 and resulting bandpassed, normalized sinusoidal data 13 is a downsampling step 13' which greatly reduces the amount of data to be processed in all later stages of the procedure. This step 13' is important because it can make the difference between a procedure that is unacceptably time consuming and a procedure that is practical.

To be sure it is also important that the procedure be accurate. Properly controlled downsampling at this step, however, does not degrade overall performance. More specifically, it is known that the data 13 are represented sinusoidally, and that these data cannot have major components at finer spatial frequencies than the smallest spacing of troughs or ridges in the authorized user's print 21.

Accordingly, in downsampling 13' it suffices to preserve representative values at a reasonable fraction less than half of that smallest periodicity—or for example about one third of the averace periodicity. Once again the template frequency content 21' is useful, in guiding selection of an optimum spatial frequency for use in the downsampling step 13'.

Philosophical overview—Four important characteristics of the invention can be gleaned already from the foregoing discussion of blocks 12 through 13' in FIG. 1. First, the assumption is made throughout that the candidate user is the authorized user—and that this assumption can be confirmed, if only we conduct a fair comparison.

It might be supposed that this assumption will lead to an overwhelming number of false-positive test results. Such a supposition would be incorrect, for I have found that a fair comparison will only highlight the underlying differences in information content between an unauthorized candidate (impostor) and the true authorized user.

The present detailed description, as it unfolds, will make progressively more apparent that each intermediate process step 23–47 of my invention—when practiced upon a typical impostor's print—is most likely to lead to catastrophic misalignment of the two prints. By far the most likely end result, in the final decision 54, is a decisive denial 55d.

The assumption under discussion is also confirmed from the opposite perspective: what happens if the candidate user is in fact the authorized user? A fair comparison is absolutely essential to eliminating the effects of enormous variation in fingerprint appearance due to details of operating conditions. Such details include, in particular, the physical and emotional condition of the user—and these considerations are especially important to avoid rejecting the authorized user.

Thus the assumption that the candidate is the authorized user only leads to a very great reduction in the amount of data to be processed, and a very great increase in reliability of the results.

A second characteristic of the invention is an overriding plan to form respective versions of the two data sets 11 and 21 which are adjusted to be as much alike as possible. This adjustment, however, is only with respect to certain data properties that are known to be variable within multiple trials or instances of essentially any single user to form a print.

These particular variable data properties, within their known degree of variability, are at best immaterial (and at worst misleading) to identification or verification. The invention is accordingly fashioned to ferret them out, so that they can be canceled out—in a word, to ignore them.

In doing so, it is necessary to accommodate the extreme time pressure associated with the candidate-data processing. Conversely, relatively long times can be devoted to obtaining several instances of an authorized user's print—and selecing the most representative one(s) of them, and performing image enhancement on the best instances.

It is desirable to take advantage of the available time to perform such extra steps, though it only very occasionally turns out to have been necessary. (In very extraordinary cases, as mentioned above in connection with establishing the statistical set 17, in lieu of a priori statistics, effort and time can also be devoted to determining the statistics of variation among those instances.)

The shaded lines 58 enclose those portions of the data collection and processing that can be performed in advance, before deploying the apparatus or receiving the candidate user's command. These portions include establishment of a statistical set 17 and the desired-certainty threshold 27, as well as the authorized-user data collection and processing 21 through 22", and 28 through 31'.

A third characteristic of the invention is closely related to the first two. This characteristic is that the invention makes the template as clean and as definite as possible—and then exploits that fact by primarily relying upon the template, rather than upon the candidate data, wherever feasible.

A first example of this is in the preferred use of the template to provide periodicity criteria 21' for both the analysis 12 and downsampling 13'—rather than relying upon statistics of the candidate data 11 for the bandpassing criteria. This strategy is preferred even though the analysis 12 does in fact extract those candidate-data statistics 15 for other purposes.

Later examples of this characteristic of the invention will be seen shortly in the preprocessing selection 31 and premassaging of numerous local subsets 31' of the template 21. This characteristic will be seen also in the preprocessing preparation 28 of local ridge-spacing maps and vector wavenumber fields 29; and also highly specialized gradient 22' and quadrature forms 22" derived from the template 21 and wavenumber fields 29.

A fourth characteristic of the invention is that it operates on the data in terms of local sine-wave patterns, rather than as isolated binary data bits or linear (ridge and groove) structures. Thus the initial noise and range analysis 12 operates not only in positional space but also in Fourier space (in other words, in terms of the spatial frequencies in the candidate image), and the new version or filtered information 13 is presented as amplitudes of sinusoids associated with each region of the original image.

By virtue of this characteristic, while guided by detection theory the invention can also take advantage of the high computational efficiency and fidelity of the Fast Fourier Transform (FFT). The FFT performs a large fraction of the computationally intensive processes in the algorithm.

Preprocessing of the authorized user's fingerprint images

During preprocessing 58 the authorized user provides a fingerprint that will be refined to form a template 21. Details of the refinement will be discussed shortly.

Where time permits, best results are obtained by acquiring several realizations, or successive trial images, of the authorized user's print—and analyzing them to determine which is most representative and whether they have any extraordinary character that may require special handling. This information is very useful in controlling the application of these data in the real-time processes that follow.

In some cases a user may appear to have more than one family or group of realizations—perhaps due to divergent, separate habits of gripping or presenting a finger. In such cases it is possible to assemble a composite of partial information from each of plural realizations, or even to store plural entire templates (with associated respective likelihoods of occurrence) to be tried alternatively in evaluating a candidate print 11, 13.

In any event, from the representative authorized-user print image or images 21, during preprocessing 58 the system selects 31 several distinctive regions, subsets or windows 31'. These small, preferably circular regions 31' are stored separately from the full template 21—as are (preferably for certain embodiments) numerous versions or variants of each region, prepared by applying a variety of crosscombinations of various-sized rotations and dilations.

Since this part of the procedure is performed during preprocessing 58 rather than later during decision-making time, there is a great deal of freedom to calculate the rotations and dilations by any of various procedures—such as, for example, by oversampling and interpolation. For reasons that will appear shortly, however, the regions/variants 31' are preferably stored in the form of Fourier transforms, rather than directly as spatial data.

Nevertheless it is preferable to calculate these transforms expeditiously. Preferably the procedure known as a "Fast Fourier Transform" (FFT) is used, although this precludes a single-step transformation in two dimensions. Two one-dimensional FFTs can be calculated more quickly.

Other important data 21', 29, 22', 22" are also advantageously extracted from the template 21 during preprocessing, making best use of the more leisurely time frame available for this work. Already mentioned are the statistics 21' for use in the image noise and range analysis 12 of the candidate image 11.

This information is found through data conditioning akin to that 12 which is discussed elsewhere in this document in relation to the candidate data. Also found through such data conditioning are normalized, bandpassed data, and vector gradient fields 22' somewhat closely related to the template data 22).

In addition, a so-called "matrix covariance estimator" is used to map 28 magnitude and direction of local ridge spacings in the template 21—to form vector wavenumber fields 29, which will be used later in forming the final template 26 for comparison 51 with the candidate data 14. During preprocessing 58 these fields 29 also are combined (not shown) with the input template data 21 in such a way as to provide smoothing along ridge lines, in the output template data 22; and moreover are also multiplied by the template gradient 22' to form two quadrature-phase forms 22" of the template data 22.

These quadrature forms 22" too will be used in forming the final template 26 for comparison—and also particularly in beginning 42 to isolate differential distortion 45 in the candidate print. During real-time processing, as shown, the two quadrature forms 22" and the wavenumber fields 29 will all be modified twice 23, 25—keeping them in step 24', 29', 26', 29" with the modified direct template data 24.

In addition, flags are set up in certain of the vector wavenumber fields 29 to warn of phase reversals in the template data 22, as will be explained below. These warning flags are used in selecting one or the other of the quadrature phase forms 22", 24', 26' of the template for use. This enables the system to avoid errors that would otherwise arise in allowing the processing to continuously traverse phase discontinuities.

Further specifics of these preprocessing steps will be introduced below in discussion of the processing stages that make use of these special preprocessed data.

Using candidate-data variance estimates—The previously discussed initial noise analysis 12 in the candidate-data (left) half of FIG. 1 may be considered roughly as a data colander, which separates data from noise. Both the data and the noise are then suitably directed, respectively, for beneficial use.

FIG. 1 shows that the data and the noise actually proceed to many of the same later stages of the algorithm, in the sense that the later processing blocks 34, 44, 51 receive both data and noise. In each of the later processing modules, however, these different pieces of information are separately received and very differently used.

Thus one of the above-mentioned side-calculation paths is application of the noise information 15 abstracted from the candidate data to enhance later stages of processing. This information 15 is in the form of an array or field of variance estimates, in effect overlaid on the reformed image data 13 themselves.

In other words the system constructs and keeps a separate index 15 of the reliability of the image data 13 in each region of the image, respectively. These reliability indices are used to weight the respective significance that is attributed to each comparison or other calculation based upon data in the corresponding image regions.

Thus for instance the noise variance array 15 is applied 16 to the final comparison step 51, so that the final test statistic (measure of probable identity between candidate and authorized user) 52 depends more heavily on portions of the candidate data 11 that are relatively cleaner. The test is thus made to depend more lightly on portions that are relatively noisier.

Such use of downweighted information, where the information is of lesser reliability, is far superior—in making maximum use of available information—to merely setting an arbitrary criterion of reliability and then discarding questionable information. The latter technique appears, for example, in Driscoll's selection of a very small number of "best-match" regions, and then proceeding directly to final decision based on such regions.

For any given intensity of calculation, and any given noisiness and distribution of noisiness in the candidate data, the downweighting maximizes the reliability of the results at each point in the procedure—and overall. For like reasons the noise array 15 is also applied 16', 16" to control certain others of the previously mentioned side calculations.

Global search and isomorphic adjustment: purpose—Another side calculation 31–38 provides a measure of simple (shape-invariant) geometrical mismatches in the formation, or realization, of the candidate print image 11, relative to the template 21. By the terms "formation" and "realization" I mean to distinguish variations in placement of a fingerprint from the information content of the candidate print itself.

Preferably for certain embodiments this second side calculation 31–38, like the first, is partially performed in preprocessing time 58. This side calculation 31–38 accounts for displacements or translations of the entire image, rotations of the entire image, and also dilations or contractions of the entire image resulting from variation in pressure with which the entire fingertip is pressed against the sensor. As will be understood, when increased pressure squashes the whole surface of the fingertip against the receiving surface, the whole fingertip surface may expand slightly—but preserving the original shape, i. e. isomorphically.

Of course the authorized user's initial print is taken with some applied pressure, so each candidate-print realization may be made with either more or less pressure than applied in making that initial print. Hence the amount of size change if characterized as "dilation" may be either positive or negative—or, if multiplicative, as a factor greater or less than unity.

The global search is "global" in two senses: first, the entire candidate print is canvassed to find one or more regions that most closely match certain preidentified portions of the template. Second, once the one or more best-match regions are found the remaining mismatch is treated as a positional/dilational error with respect to the entire useful area of both prints.

Identifying comparison regions for the global search—The comparison regions 31, also called "local subsets" of the template 21, are first identified 31 (and if desired their data separately stored) during preprocessing 58. They are identified 31 as regions that have some particularly distinctive character.

Such distinctiveness may be defined for example in terms of high rates of change of harmonic content. If preferred, within the scope of my invention they may instead be defined in more conventional ways—such as closely adjacent plural/multiple ridge or groove endings.

In the preferred embodiment, the choice of subset is made by locating a circular subset window in such a way as to minimize the values of the crosscorrelation function of the windowed subset versus the entire template image—at non-vanishing offset values. Preferably plural windows are established 31 in this way, each under the assumption that any already-established windowed region is unavailable.

In any event it is important that the selected windows contain essentially the most distinctive features of the authorized user's print, since they will be used to guide the process of adjusting the template to match the candidate. If the features used were instead relatively common, the system would be more likely to perform the adjustment incorrectly even if the candidate is the authorized user—resulting in a false-negative finding 55*d*.

Each of the local subsets selected 31 represents a view of a small part of the template, as seen through a small window. The size of the window is important: it must be large enough to contain a moderately complex and therefore truly distinctive set of features.

Nevertheless, it must be small enough to preserve correlation—which is to say, enable recognition—of its distinctive features when allowance is made for isomorphic translations, rotations and dilations, and even if the fingerprint has undergone more general locally-varying distortions.

It is also desirable that the several identified 31 subsets be reasonably well separated from each other. If they are too close together, they may not be independent enough to complement each other in the ways to be described.

As suggested earlier, if a particular authorized user is found to have more than one discrete way of placing a finger on the apparatus then special provision may be made for accommodating this idiosyncrasy. (This case is to be distinguished from the normal range of positioning variation about a single mode of placement.) For instance it is possible to incorporate auxiliary memory, perhaps at added cost, to cover the extra storage requirements—for such an authorized user who has two or more fingerprint personalities.

Alternatively, and particularly if the authorized user happens to be interested in minimizing false positives rather than false negatives (incorrect acceptances rather than incorrect rejections), then an adequate solution may lie simply in planning to test fewer variations about each of two discrete placements.

In later real-time comparison processing, the invention will search through the downsampled sinusoidal data 14, 14' from the candidate user, to find a closest available match for at least one of the subsets from the authorized user. The way in which the subsets are prepared for such a search, during preprocessing 58, strongly influences both (1) the data-storage requirements for the system and (2) the time which passes while the prospective user is waiting for the invention to make its decision.

A tradeoff between these two factors, data storage and real-time processing, leads to two major alternative approaches to managing the subset preprocessing. At present the limiting consideration is time; however, in the future if much higher processing speeds become available it may become desirable to instead opt for solutions that reduce storage at the expense of time. Therefore both approaches will be outlined here.

For minimum data storage, it is possible to simply save each selected subset in the original form that appears within its respective small-window portion of the template. In this case, the subsets shown as rectangles 31' in FIG. 1 may be identified on a one-to-one basis with those selected windows, although actually there are likely to be only three or four such windows.

This minimum-data-storage case is in fact an extremely important one, so that actually it is highly desirable to save each subset—and indeed the entire data set for an authorized user—in an abstracted or abbreviated form rather than in its original form. Accordingly these options are associated with one major preferred embodiment of the invention.

They are important in particular when a compact, self-contained system either must store many templates, for each one of many (e. g., a hundred) authorized users, or must read in a template from a remote data bank—or from an identification card (e. g., with magnetic strip or bar code) carried by the user. Either of these cases puts a premium on smallness of the data file for each user, since full data (and even more emphatically preprocessed full data) are very costly to store within the system for multiple users, or to transmit or store on an ID card. This first major preferred embodiment is particularly applicable in environments where a short additional delay, perhaps a half second to a second, for calculations is acceptable—automatic tellers, office doors, etc.

In later real-time processing, however, if a subset is presented for comparison only in its original form, sifting through the candidate data 14' for a particular subset is relatively unlikely to succeed. This is true even if the candidate is in fact the authorized user, since there is a fairly strong likelihood that the subset of interest has been rotated or dilated, or both.

Therefore a fair test requires, to begin with, checking each region of the candidate data 14' against several rotated forms of the subset under test—rotated through different angles. In addition to a nonrotated subset, the preferred embodiment checks eight nonzero rotations, ranging from negative (clockwise) through positive angles.

A fair test also requires checking each such region against several dilated forms of that same subset—dilated by different factors, ranging from values below unity through values above unity. A second major preferred embodiment therefore checks, in addition to a nondilated subset, six nonunity dilations.

Furthermore each region of the candidate data 14' should be checked against forms of that subset which have been both dilated and rotated—covering most or all crosscombinations of those same rotation angles and dilation factors. Taking into account the zero-rotation, unity-dilation cases, the second major preferred embodiment of the invention preferably uses nine rotations and seven dilations, for a total of sixty-three cases to be checked.

Each case represents rotation and dilation isomorphically—that is to say, without change of shape. Each of the sixty-three variants may be termed an "isomorph".

As will be understood, for a representative three subset windows this works out to nearly two hundred isomorphs to be checked against each recion of the candidate. During real-time processing all these variant forms can be constructed geometrically by the processor, but at this writing the additional time occupied in this effort—or the additional cost of parallel processors to do this work—tends to make this approach prohibitive for high-urgency applications such as weapons or emergency communication systems.

Preferably instead, for the present, each of typically three subsets is preformed (or "premassaged") into each of the sixty-three isomorphs (FIG. 2) described above, and each of the resulting one hundred eighty-nine isomorphs is stored in the apparatus. This represents the tradeoff that yields minimum processing time but maximum storage, and as pointed out just above is associated with a second major preferred embodiment; it is particularly appropriate to single-user environments (e. g., personal weapons) where extremely rapid verifications are required with very high certainties.

For a clearer conceptual grasp of the multiple-isomorph preformation technique, an original subset 31 (FIG. 2) may be regarded as at the center of an array of several rotations (shown in the drawing as arrayed from left to right in order of increasing counterclockwise angular values) and several dilations (shown as arrayed from bottom to top in order of increasing dilation). Rotations are emphasized in the illustration by radial tick marks at the four compass directions of the original.

Negative or clockwise rotations thus appear to left of the centrally placed original 31, and dilations by factors less than one—or in other words contractions—appear below that central original 31. Pure rotations are in the same row directly to left and right of the central original 31, and pure dilations are in the same column above and below it.

Crosscombinations make up the remainder of the illustration, for instance an isomorph 31'*m* of maximum negative rotation combined with a two-thirds-of-maximum positive dilation being shown near upper left. Whereas an original subset 31' (FIG. 3) is always in the original relation to its full template 21, in general it will later be found in some other relation (if at all) in the candidate data 11.

Figure 2:
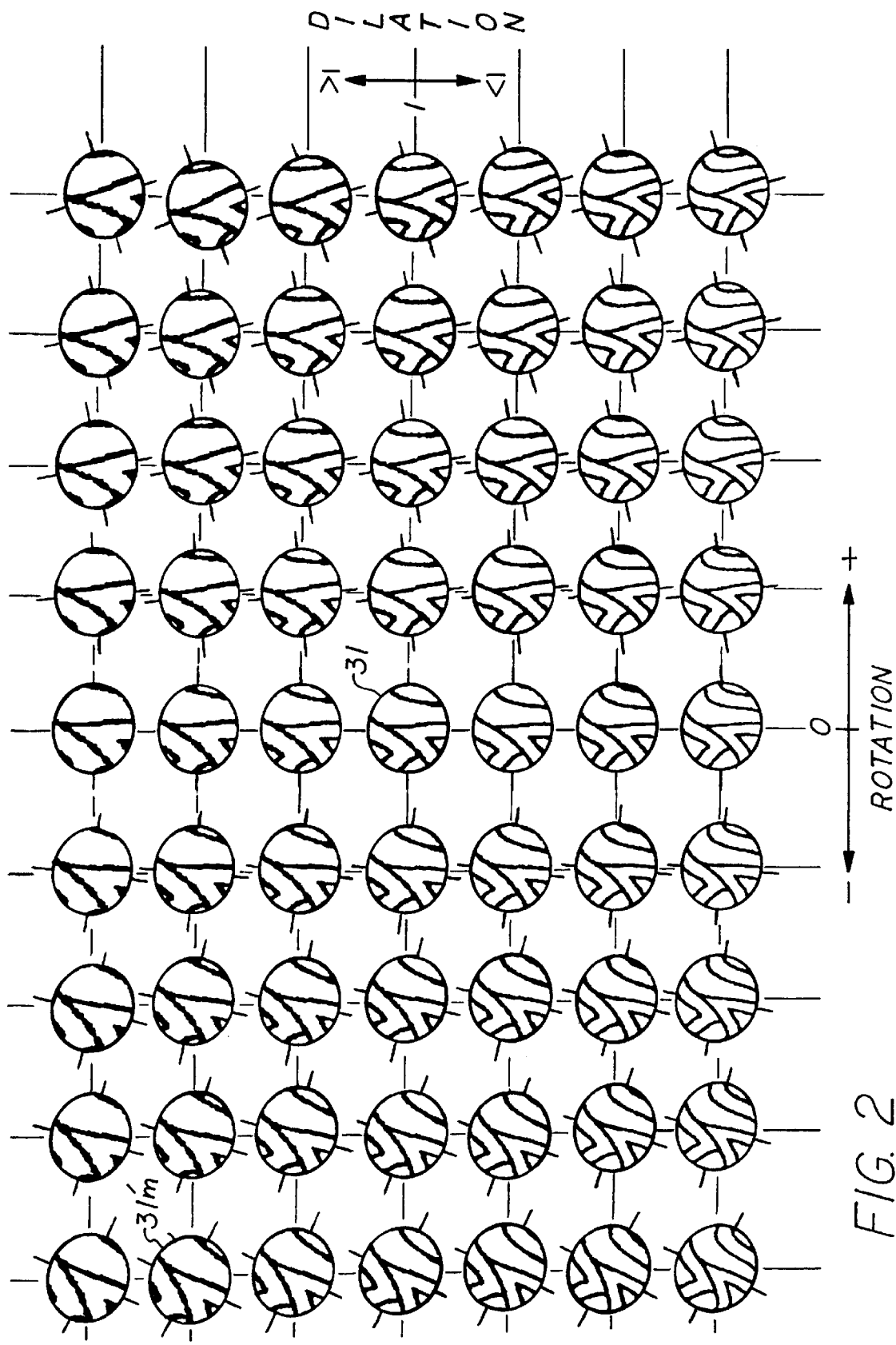
FIG. 2 is a rough conceptual presentation of a windowed subset of the authorized-user template, arrayed with sixty-three isomorphs of that subset—nine rotations and seven dilations (including the original)
Figure 3:
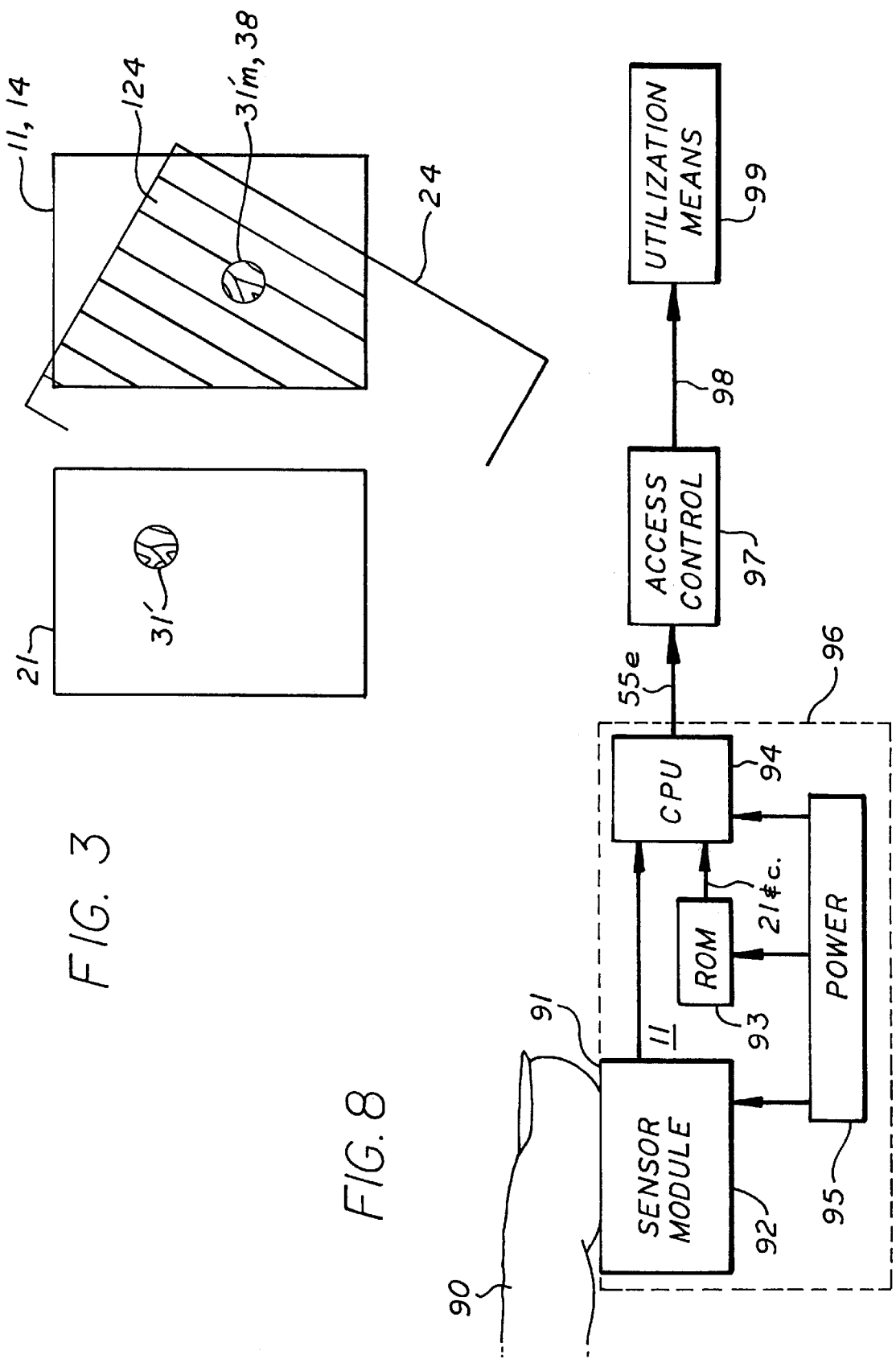
FIG. 3 is a rough conceptual diagram of the original subset of FIG. 2 in position in the authorized-user template, and one of the nine-by-seven array of isomorphs linking that template with the candidate data.

Thus the same above-introduced isomorph 31'*m* (FIG. 2)—clockwise-rotated and rather strongly dilated—may appear in a different position in the candidate data (FIG. 3). The association of such a structure 31'*m* with both the template 21 and candidate data 11 thus links the two data sets together, and reveals how an isomorph 24 of the entire template 21 must be selected and disposed for a fair comparison. Just such information 38 is what is sought by the global search 32–37.

As will be clear to those skilled in this field, any of a great variety of compromises may be struck. These may involve—merely by way of example—storing all the rotational variants but constructing all the dilational variants on the fly, or vice versa; or storing certain of the rotational variants and constructing others as perturbations of the stored ones, etc.

Thus a third major preferred embodiment is associated with a family of such tradeoffs, one tradeoff in particular involving use of seven rotations and three dilations for a total of twenty-one isomorphs at each subset 31'. Another tradeoff is performing most of the derivations 28, 29, 22', 22", 31 on the fly.

For the above-mentioned second major preferred embodiment illustrated rectangles 31' in FIG. 1 actually represent a considerably larger number of stored variants of some three subsets or windows selected 31 from the template 21. This preparation pays off handsomely later, in a blindingly efficient search through the candidate data 14' for all one hundred eighty-nine isomorphs, constant-shape variants.

For maximum search efficiency it is advantageous to store the Fourier transforms of the subwindows, rather than their direct spatial representations. As will be seen, this preference saves time in the real-processing stage because the procedure preferably uses the transforms.

Returning briefly to the first major preferred embodiment mentioned above: storage of templates in abstracted or abbreviated form (e. g., level-downsampled to two-bit or binary data) does require care to avoid loss of ultimate performance. I have found that such storage need not impair accuracy if the data are properly processed after retrieval.

In particular, routine template-data steps of bandpassing, normalizing and smoothing should be performed on the abstracted data to as nearly as feasible reconstitute the original information set. These steps beat down the high frequencies introduced by storage in one- or two-bit form.

Another critical time for success of such methods is preparation for storage. The raw data should be smoothed, downsampled and normalized before storage.

Selection and stepping of the comparison regions in the global search—In real-time processing, the first (most distinctive) of the subsets or windows 31' is selected for comparison with the filtered candidate print 13. In FIG. 1 this function is called "subset stepper" 32.

More specifically, the stepper 32 selects a first one of the sixty-three isomorphs of the first window or subset 31'. In simple spatial terms, it is desired to find a portion, a small region, of the candidate print 14' which most closely corresponds to this first subset isomorph 31'.

One straightforward way of finding that most closely correlated candidate-print region would be to simply pass the first subset isomorph 31' systematically over the whole candidate print. While doing this, it would be necessary to keep a record of the quality of the match between the isomorph 31' and each portion of the candidate print traversed.

For example, the apparatus might first position or superimpose the first subset isomorph or variant 31' in the upper left-hand corner of the candidate print, and measure the similarity (goodness of correlation) between the first variant 31' and the superposed candidate region. Then the apparatus would record that correlation value in association with the position. Next the first variant 31' might be shifted to the right by a distance equal to some fraction of the typical ridge spacing, and the measurement and recording repeated for this new position. When the comparison process reached the right-hand edge of the candidate, the apparatus would shift the first variant 31' down by, again, a distance equal to some fraction of the typical ridge spacing, and then again scan across the candidate print while recording correlation values at each position. This entire sequence would be iterated until the comparison had been completed for all rows.

From the recorded data the system could then pick the best correlation value, and retrieve the position information associated with that value. The result would be a specification of both (1) the best correlation position for the first subset variant 31' and (2) the quality of the correlation there.

The scanning-and-recording procedure described to this point is closely equivalent to the mathematical procedure of convolving the candidate print with the first variant subwindow. As can be seen from the above description it entails a very significant amount of processing time, though it only finds the best correlation for just one of the plausible rotations and/or dilations of the first subset.

With the data expressed in sinusoidal terms as previously mentioned, the same output information can be found much more efficiently by search for the correlation in Fourier space, as follows. First the Fourier transform of the candidate print is multiplied by the Fourier transform of the particular rotated, dilated subwindow of the template.

Then the resulting product is back-transformed, and the resulting real array holds the quality of correlation for each position of interest—i. e., for each position in the candidate print, just as if found by stepping across and down as described above. In this array, the location of the maximum correlation value represents position in the candidate print, and the value itself is the quality of correlation at that position.

The output array of the back-transform actually holds data that is the equivalent of spatial stepping at intervals equal to the data spacings—i. e., in view of the previously mentioned periodicity-controlled downsampling 13', finer intervals than the ridge spacings. Thus the procedure yields the best-match position of the subset in the candidate, and the quality of the match.

From a purely mathematical point of view, this two-step process might be deemed equivalent to convolving the candidate with the subwindow—but, if so, only in the sense that mathematical proofs are available to show the equality of the output numbers. In practical terms (and patent terms), to the contrary, the Fourier method is not at all equivalent: the process itself is extremely different, and the result includes obtaining the desired information in a far shorter time and with many fewer computer transactions or steps.

Thus this Fourier process is preferable to direct comparison of the spatial data because it is much more efficient. In preparation for this process, as mentioned earlier, the numerous subwindows of the template are preferably stored as their Fourier transforms, and the candidate print too is Fourier transformed—just once, at first entry to the locationestimating stage 34.

For best results some positions in the candidate print in other words, some values in the array—are excluded from consideration. The apparatus should not be allowed to select regions that are subject to edge effects, in particular, or any other systematic major corrupting influence.

The Fourier-transform procedure itself has alternative versions. In particular, for greatest efficiency, rather than a two-dimensional Fourier transform the invention can calculate two successive transforms of the so-called "Fast Fourier Transform" (FFT) type, one for each of the two dimensions of the candidate print.

The invention as described to this point thus finds the region 38 (FIGS. 1 and 3) of the candidate print that most closely matches the first subset 31' of the template, taking into account an ample range of rotations and dilations—i. e., a best-matching isomorph 31'$m$. In the process the invention also finds a measure of the quality 36 of that closest match 38.

If that quality is better than a preestablished threshold, the invention is programmed to conclude that the found position, orientation and dilation are clear and clean enough for use in the following stages of the procedure. At this early stage, the displacement, rotation and dilation thus found are assumed to have affected the entire template equally—i. e., globally.

In other words it is assumed here that the candidate print may have resulted from only certain kinds of changes in the template: shift, rotation, and overall change of scale isomorphically (change of size while maintaining constant shape). The apparatus then proceeds to use this information in an isomorphic adjustment 23, which will be discussed shortly (and which will be a prelude to the next major side calculation 41–47, 25–26).

If, however, the quality 36 of the closest match 38 is not better than the preestablished acceptable quality, then it is reasonable to conclude that either (1) the candidate print was not made by the authorized user or (2) operating conditions led to some disruption of the authorized user's print, particularly in the area of the first subset 31'. This second possibility must be carefully accommodated to avoid false negatives—i. e., rejection of the authorized user.

The preset threshold of quality used here does not operate arbitrarily to cut off analysis, as for example in the Driscoll system. Rather, if the candidate print fails the established quality criterion here, the only conclusion made is that perhaps the failure is just a matter of unusable data arising from local disruption of the authorized user's print. In this case the system is programmed to repeat the stepper process 32, but using another subset from the original selection 31 of subsets or windows 31' in the authorized-user template 21—in effect simply looking for usable data elsewhere in the candidate data 14'.

(Similarly, the use of preestablished ranges and intervals of rotation and dilation is not arbitrary, but justified both from experimental measurements and on the basis of physical principle. As to principle, the ranges are established as arising from the amount of rotation physically permitted in placement, and from the amount of dimensional change that can be produced in a fingertip by pressure within normally encountered variations. These considerations should be contrasted with Driscoll's arbitrary use of a least-squares fit for uncontrolled and unjustified departures from an expected rotation pattern.)

When the invention cannot find an adequate matching position in the candidate data for any of the sixty-three variants of the first window, it resorts to the next most distinctive window or subset 31' previously selected. The invention looks for a best correlation position of dilated and/or rotated forms of that window.

As with the first window, the process checks numerous variants, in effect stepping across and down the candidate print with not only the second subset but also its isomorphs at each of a series of orientation angles crosscombined with a series of possible dilations. Again from the many resulting correlation measures, the best is selected. It identifies the candidate region that is a closest match to the second window 31', and at the same establishes a rotation and dilation assumed to have affected the entire template.

Again if this second set of data fails the quality threshold, the system can resort to a third, and sometimes (rarely) even a fourth. If usable data are found with any of these, the system proceeds to the previously mentioned isomorphic adjustment. If not, still other levels of analysis may be used as fallbacks; however, in testing, my invention has been found to operate satisfactorily without resort to such fallbacks. In other words, the invention has been found to successfully find a usable correlation between some one of the subsets 31' and any input data 14' that represent a real fingertip pattern.

Although the foregoing paragraphs describe a particularly efficient and advantageous technique, various strategies may be adopted to find the best variant of the best window 31', and best matching candidate-print position. All such strategies, whether using direct spatial stepping or Fourier techniques, are within the scope of my invention and so within the sweep of certain of the appended claims.

As indicated above, if the best match to the first subset is of marginal or poor quality the selector/stepper 32 will select another subset, and similarly may then select still another. This happens most typically if the candidate is an impostor. Thus processing delay is least likely to be extended when the candidate is actually the authorized user—a collateral benefit of the previously mentioned operating assumption that the candidate is the authorized user.

It is possible, however, that the first subset cannot be matched to any region of the candidate print even though the candidate is authorized. This failure may perhaps be due, for example, to damage, unusually severe distortion, abrupt folding (if such folding can occurs or obscuring of the skin—or a piece of dirt or a stain—in that region.

The above-described iteration of the procedure using a second distinctive region 31' is intended to deal with this exigency. Preferably the stepper 32 selects the subsets 31' in decreasing order of distinctiveness, and typically the second subset is only somewhat less distinctive than the first. Therefore only a slight loss of certainty in overall result 54–57 is suffered by resort to the second subset.

If the candidate is not the authorized user—and only rarely otherwise—the stepper may proceed to try a third and successive subsets 31'. Eventually the best (or most typically for an impostor the least poor) of the subset/placement combinations is selected for use, and as will be understood the subset in this case is—relatively speaking—not very distinctive.

If, to the contrary, two or more of the subsets 31' yield comparably acceptable (but both rather poor) isomorphs, my invention could attempt to resolve this ambiguity by repeating the procedure for these two subsets. For this situation, however, in principle the two subsets or regions may be treated concurrently, as a unit—or, alternatively, each of the two subsets may be considered separately, but with each subset or region being enlarged by addition of an immediately adjacent region.

Such operation, though well within the scope of the invention and the sweep of certain of the appended claims), has been found unnecessary. The preferred embodiment accordingly includes no such hybrid-subset procedure.

Isolation and use of the best overall match: isomorphic adjustment—Eventually the stepper 32 settles on a subset-and-isomorph combination 31'm, 38 (i. e., combination of subset with location, orientation and dilation) of a single or enlarged composite region that yields the best quality-of-match index 36. At this point the focus shifts from selection of the subset-and-isomorph pair to use of the isomorph alone.

Thus the iterative procedure 32–37 produces an output that is the isomorph 38 from the best subset-isomorph combination. Again, this isomorph 38 represents the shift, angling and expansion of the template 21 which make the template best match the candidate 11 in the vicinity of the selected subset of template data.

As will be seen, there is a possibility that it is only in this vicinity that the template best matches the candidate. In fact, a particularly advantageous aspect of the present invention is an ability—as will be fully explained below to deal with this possibility. At this stage, however, this best-match information is all that has been assembled.

Therefore this best-estimated position/angle/scale combination 38 is applied 23 as a correction to the template signal 22—forming an adjusted template 24 (cf. FIGS. 1 and 3) that is more fairly comparable with the filtered candidate data 13. In short, following the global search 32–38 is an isomorphic adjustment 23.

In the isomorphic adjustment, as the name conveys, no change of shape occurs—but the entire template signal 22 (i. e., the template throughout all of its regions) is shifted, cocked, and dilated or contracted, to form an isomorph 24 of the entire template 21, that matches as nearly as possible the corresponding features 38 of the candidate print as found in the selected window 31'. Again, while it might be supposed that it would be reasonable to adjust or perturb the filtered candidate data 13, 14, the philosophy of the invention is to modify 23 the template data 22 preparatory to the comparison.

Reasoning behind this philosophy may now be better appreciated: the template is relatively cleaner and clearer, and these properties are reasonably well retained in its adjusted form 24. Adjustments to the candidate data 13, 14 would interact with its relative noisiness, and statistically speaking through second-order effects would disturb the likelihood of a match.

The total area imaged in the candidate print 11 cannot be closely controlled to match the template 21—and the template furthermore is shifted, angled and dilated. Naturally when the two data fields 14, 26 are eventually overlaid for comparison some areas of each data field will fall outside the other, and therefore be unusable.

As in all print-analysis systems, comparison will then proceed on the basis of the remaining areas, those areas which coincide, or in other words what may be called the "usable" or "overlapping" data 124 (FIG. 3D. In the conceptual illustration, the coarse hatching is only intended to help identify the overlap region 124, not to suggest fingerprint ridges or the like—which of course are much finer. (The exact extent of the overlapping data cannot actually be known until both template adjustments 23, 25 are complete.

In the Driscoll and Denyer patents, very small data excerpts from template and sample are used in proceeding directly to a final decision. As pointed out earlier, reliability of such hasty conclusions appears questionable.

In the present invention, by contrast, similarly small amounts of template data 31' have been used, in the global search and isomorphic adjustment, in a very different way—namely only to obtain an intermediate result. That result is a "once-adjusted" template 24 which is more fairly comparable with the candidate image data 11–14.

All of the overlapping data in this adjusted template 24, which is to say essentially all the overlapping data in the original template 21, will eventually be used. Furthermore, all these data will be used in comparison with essentially all of the overlapping data 14 from the candidate—i. e., excepting only the data points removed 13' as redundant.

Demodulation, gradient search for distortion, and distortion adjustment: purpose—As explained above, the isomorphic correction 23 adjusts the entire template based upon relative placement in just one small region. (Even two "subsets" used together would remain a small fraction of the whole image.)

Therefore, even if the candidate is in fact the authorized user, there still exists a crucially important potential for mismatch between the adjusted template 24 and candidate data 14. That potential resides in the possibility of twisting or other deformation in the candidate print.

In other words, the candidate user's finger may have been applied to the sensor surface in such a way as to distort the overall pattern. Such distortion consists of differential offsets, rotations and dilations internal to the pattern.

No single isomorphic adjustment can possibly take account of such internal differential effects. It is believed that this internal-distortion phenomenon may be most to blame for failure to reliably verify presence of an authorized user—false negatives—in even the most highly sophisticated of prior-art systems.

Again the Driscoll patent seeks to deal with these phenomena by allowing for, and searching for, small movements of a secondary and/or tertiary window relative to expected position. The system of Driscoll apparently is limited to such displacements that can be interpreted as part of an overall rotation of the print.

Driscoll does use a least-squares fit to find the best position for an overall-rotated version of his template, to use in comparison. Such a fitting technique may perhaps implicitly permit other kinds of movements—isomorphic dilation or differential distortions. A least-squares fit, however, would be appropriate if departures from positions corresponding to an isomorphic rotation were merely "random" error in the larger sense of lacking correlations, lacking even soft constraints.

The present invention proceeds on the basis of a much more complete statistical model than Driscoll's methodology implies. The present invention automatically applies a kind of relatively low credence, on a sliding scale, to information that has a relatively high degree of inconsistency—but without entirely discarding such information.

Although some uncorrelated measurement error may be present, there is no basis for assuming that the entire amount of departures from predicted positions are without mutual correlation. Different portions of fingertips are not understood to undergo relative displacements that are uncorrelated.

To the contrary, different portions of fingertips are understood to be physically interconnected by skin and flesh, interrelated through their interactions with skeletal members, and otherwise coordinated systematically. Furthermore the use of a least-squares fit, being divergent from the reality of skin-pattern internal relationships, cannot provide meaningful guidance for either assessing or limiting the character or magnitude of relative movements other than those found through isomorphic rotation.

The Denyer patent too speaks in very general terms of making allowance for such movements. It offers little or no guidance as to how such allowance might be made.

What both these prior systems fail to provide is any systematic basis, certainly any principled theoretical basis, for constraining the amount of "allowance" for these movements that is permitted. This failing is crucial, for inadequate "allowance" will result in turning away an authorized user, but given enough unfettered "allowance" almost any print will match almost any other.

Of course some experience may be brought to bear in making an educated guess about amounts of rotation or twisting that seem plausible, and amounts that seem too permissive and thus too likely to grant access to impostors. The measurement space in which such prior-art guesses must be made, however, appears very ad hoc or addressed to a particular physical—immediacy essentially a form of designing at the drill press.

The proper extent of such "allowance" is therefore not readily amenable to quantification or to statistical analysis, and this fundamental limitation aggravates the previously noted limitation of making final decisions based on a small fraction of the available information. As will be seen the present invention, by contrast, is able to relate the amount of solidly expected variation—through direct application 18, 18' of the a priori statistics 17—to the measurement preparations 44 and final-decision preparations 52.

The assessment and use of this sometimes-so-called "prior portion" 17 of the expected signal statistics advantageously tend to favor smoothness in the distortion field as estimated. The prior statistics rest on an implicit assumption that the distortion field contains some correlation structure—some physically based interrelationship between what happens in one part of the field and what happens in another.

As noted above, different portions of the skin pattern are, after all, physically interconnected—so that each part pulls on each other part (and that "other part" pulls back). The prior statistics thus quantify the degree to which individual displacements (which in the aggregate constitute the distortion field) are correlated with each other. Preferably a Fourier-space model is used for the prior-portion statistics 17.

With some of the hardest work done in the global search 32-38 and isomorphic adjustment 23, my invention is now able to very efficiently isolate 42–47 and adjust 25 (cf. FIGS. 1 and 4) the template for distortion. In a very rough conceptualization, this is accomplished by applying 25 (FIG. 4) the distortion field 45 to the once-adjusted template 24, to obtain a distortion-corrected template field 26.

The distortion field 45 (FIG. 4) also is roughly conceptualized as a field of displacements 45a, for example moving fixed vertical grid lines 45" symbolizing the structure of the frame of reference itself, i. e. the web of the skin as distinguished from its pattern of ridges and troughs) to left or right so that the grid lines 45" assume new forms 45b. Arrowheads 45a representing the individual displacements are in many portions of the drawing very short, and so can be seen as only very small arrowhead tips.

The distortion field 45, 45a has been drawn very simplified, so that there are no displacements of the horizontal grid lines 45'. The drawing does show, however, that on balance the overall amount of leftward and rightward shifting is about equal—as it should be, since any isomorphic dilation or contraction should have already been incorporated into the isomorphic adjustment 23 which formed the first-adjusted template 24.

Figure 4:
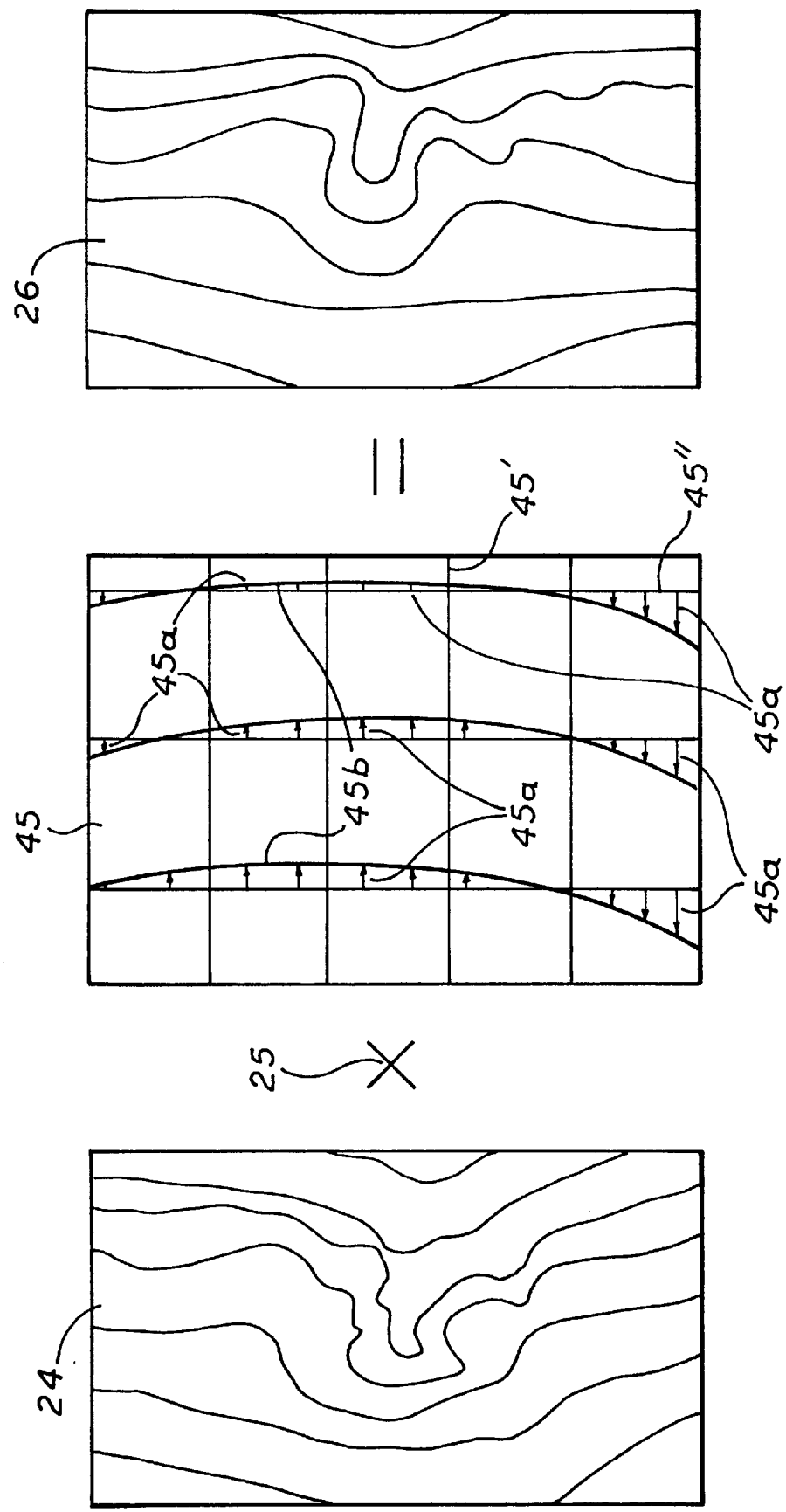
FIG. 4 is a rough conceptual diagram, conveying the general principle of applying a distortion field to modify the template.
Figure 5:
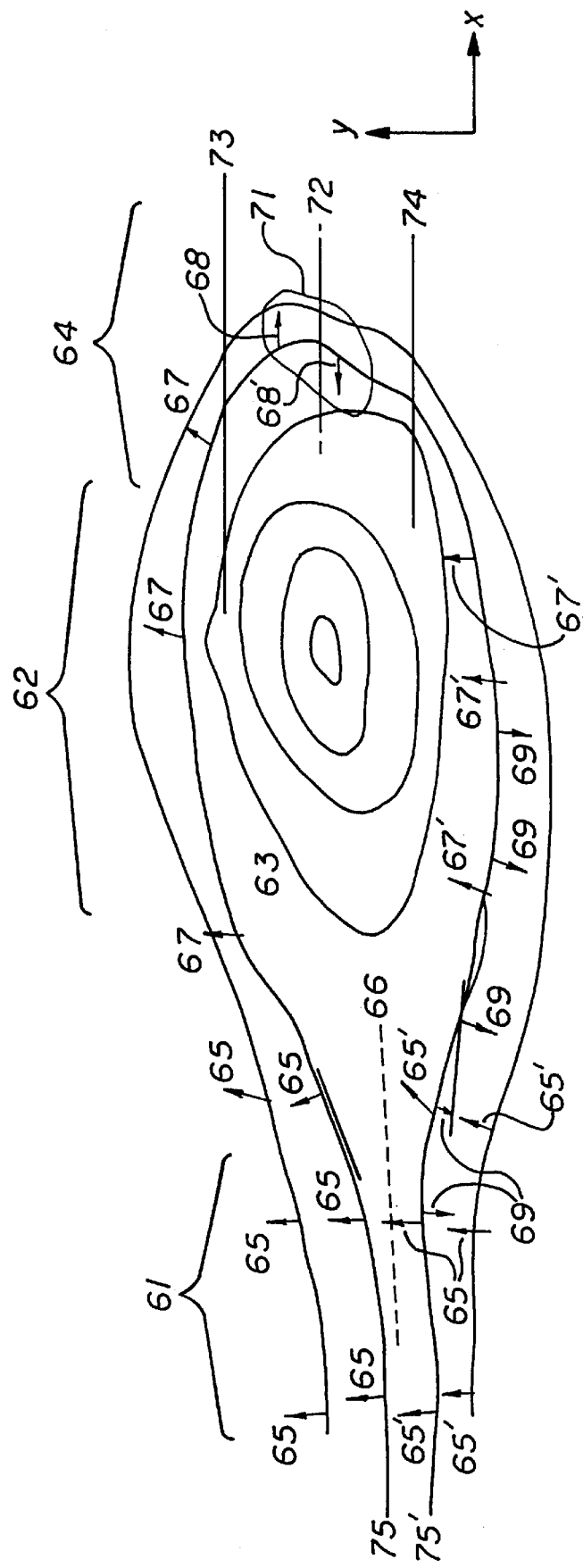
FIG. 5 is a highly enlarged conceptual diagram of a whorl area in a fingerprint, particularly illustrating changes of interridge phase in the area.

The symbol "x" in FIG. 4 is not to be misinterpreted literally as an actual multiplication: though some complex multiplication is involved, that would be an oversimplification; rather the symbolism of multiplication is only intended at a rough conceptual-analogue level to represent application of a distortion field 45. The distortion-corrected field 26 will later be used as a matched filter in the final comparison 51.

To extract 42–44 the distortion 45 and so prepare the data for this nonisomorphic adjustment 25, I first treat the distortion 45 as if it were a data signal impressed upon a carrier wave—in other words, as if the distortion were a relatively slowly-varying information signal modulating a carrier.

The carrier in this situation is the relatively higher-spatial-frequency ridge/groove pattern of the natural fingerprint, with the finger at rest or undisturbed by differential stresses. Two clarifications are needed:

First, it must be recognized that in the final analysis, literally the final analysis 51–56, what is of interest is the ridge/groove pattern rather than the distortion. The focus upon the distortion at this point is only temporary and only for purposes of isolating and then canceling it—just as the global search isolated placement/dilation so that it could be globally abut isomorphically) canceled.

Second, not only the distortion but also the "instantaneous carrier" (local harmonic content of the ridge/groove pattern) varies strongly from place to place within the candidate image 13. Hence it must be understood that distortion will necessarily be extracted as a vector field, varying over the image area, not a single global parameter and not even a scalar field—and the "carrier" too must be treated as a field with many strong local variations.

Obtaining a "carrier" for use in demodulation—Fortunately it is not necessary to determine what this varying carrier field is, in the candidate image 13. Instead the authorized-user template 21 is taken to be the carrier for the candidate data.

Properties or characteristics of the template 21 needed to implement this approach can be found in advance, during preprocessing 58. Part of this is done by in effect mapping 28 the local ridge spacings and orientations, and saving the resulting magnitudes and directions as vector wavenumber fields 29.

Here too the assumption that the candidate is the authorized user is put to major advantage: the template 21 is assumed to be the carrier of a distortion field, a vector field, in the candidate 11, 13. The vector wavenumber fields 29 of the template represent the spatial frequencies of that carrier.

Once again, if the candidate is not the authorized user, these latter assumptions fundamentally become gibberish and the ensuing correlation most commonly fails dramatically.

Demodulation of the distortion field—My invention next proceeds to actually estimate directly, in three steps 42–44, the entire distortion field 45. The first step 42 is demodulation to obtain an intermediate result, namely a complex field whose phase is sensitive to the assumed vector distortion field.

For this purpose, forms 41, 41' of the template 21 are needed that contain information about both the ridge locations (with their spacings) and their orientations. Stated first very simply, multiplying the template form(s) 41, 41' and the candidate data 14" together yields the desired intermediate field 45.

The original template 21 (as well as the once-adjusted template 24) taken by itself is passed 41 to the demodulation process 42, but lacks phase information that is needed for such a procedure. For this reason I begin by constructing somewhat synthetic or artificial forms 41" of the template that include such phase information.

More specifically, the template 21 (the carriers is first expressed in a modified form, which is obtained through multiplication of its spatial gradient field 22' by its own vector wavenumber field 29:

$$\text{(quadrature form)} = \frac{\text{(template gradient)} \cdot \text{(wavenumber field)}}{\text{(wavenumber)}^2}.$$

This preliminary product represents a scalar 22" that is in quadrature with the template.

By the phrase "in quadrature" I mean 90° out of phase, or using radian angular measure $\rho/2$ out of phase. In other words the scalar 22" found by this multiplication process is everywhere in the pattern inherently one quarter of a spatial wavelength offset from the basic template. The denominator normalizes the expression; thus the quadrature form differs only as to phase, not as to amplitude.

It is known that a quadrature form of a periodic positional signal, used in conjunction with the basic positional signal itself, can yield directional or phase information for use by automatic apparatus in determining, for example, a direction of motion. In my invention a like underlying principle is used, albeit in a conceptually very remote context, to enable the algorithm to keep track of the direction in which features of the candidate print are offset from features of the template.

If not for the reentrant character of most skin patterns of interest, it would be sufficient to use a quadrature form 22"

of the template in just one single version. The typical closed patterns 62 (FIG. 2) and whorls familiar in fingerprints, however, render such a simple representation inadequate for the following reasons.

In a generally linear region 61 of a print, of course if one could monitor, along a path very generally from ridge 75 to ridge 75', it would be natural to expect continuity of phase-gradient direction 65, 65'—i. e., the direction locally perpendicular to each ridgeline, in which phase increases. By the phrase "continuity of phase-gradient direction" here is meant the property of the direction being consistent, or in other words not reversing except perhaps where it is near zero).

Such continuity as illustrated by phase-direction arrows 65, 65' near the left end of the drawing, is expected irrespective of the fact that two adjacent, parallel ridges 75, 75' happen to open up into a whorl 62, and as shown even a whorl which includes distinctly closed loops.

The phase-gradient directions 65, 65' for both such adjacent parallel ridges 75, 75'—which happen to span such an enlargement 66—can be traced toward the right along the respective ridges 75, 75'. Eventually a point 72 is reached at which the "two" ridges 75, 75' are found to have been actually different tails of just one common ridge 75-75'. At some such place along the way, therefore, the initially common phase-gradient directions 65, 65' are found to be directed oppositely 68, 68'. If this phenomenon is not somehow controlled, the entire phase field becomes unmanageably ambiguous as can be seen by tracing the upward-pointing phase arrows 65 around the loop.

Such tracing finds likewise upward-pointing arrows 67 across the top of the whorl 62, rightward pointing arrows 68 along the right end 64 of the pattern, and downward-pointing arrows 69 back across the bottom to the left end 61. Even in this latter region 61 of generally parallel and rectilinear ridges 75, 75' the downward arrows 69 are oppositely directed from not only the upper set of phase arrows 65 above the division line 66 but also the lower set 65'. That lower set, as will be recalled, is associated with the identical ridge line 75' below the division line.

To deal with such potentially troublesome discontinuities, my invention forms not just one but at least two quadrature forms 22" of the previously discussed gradient-times-wavenumber product—which is a scalar. Furthermore in operation the algorithm of my invention must automatically select a particular one of the plural cuadrature forms for use.

Preferred embodiments of my invention make this selection based upon monitoring for phase discontinuities of the sort illustrated. The monitoring is preferably carried out by detection of sudden reversals in the sign of the wavenumber field 29.

These sign reversals can be found during preprocessing 58, and their locations marked by warning flags 73, 74 a specified distance from each discontinuity 72—in each direction along an axis transverse to the discontinuity. Preferably this work is done during preprocessing, in formation of the template, moving one step at a time in either the x or y direction, in real space—while requiring neighboring values to be substantially continuous, and setting up the flagging in an associated wavenumber field 29.

In terms of the FIG. 2 example, continuous processing along a vertical (v) direction locates the discontinuity 71 at a height 72 in the pattern.

Later in actual candidate processing, with the wavenumber field downsampled 43 onto the coarsest grid, the system watches for the flags 73, 74 only at right angles to the direction v selected previously for imposition of continuity.

This strategy enables the processing to stay some distance away from a discontinuity.

For computational (and tutorial) convenience I express the template 21 as a complex number. I set the real part of this number equal to the direct spatial form of the template 21, 22, and the imaginary part equal to the selected one of the preliminary products, the in-quadrature scalars 22", just described, i. e.:

$$template'=template+i.(quadrature\ form\ of\ template),$$

where i is the base of imaginary numbers, the square root of negative one.

Both the real 22 and imaginary 22" parts of this variable are then subjected in real processing time to the isomorphic adjustment 23. The adjusted results 24, 24' are passed 41, 41', as already suggested, to the demodulation process 42.

Here the complex variable template' as mentioned above is multiplied by the candidate data 14", yielding a new complex variable in which is embedded phase information related to the distortion field that is being sought. The distortion field in fact is fundamentally a phase-displacement field, though in some minority of cases the phase shifts due to distortion exceed a half-wave (180°, or π radians) and even a whole wave (360°, or 2π radians).

The cases in which maximum distortion thus exceeds half of a ridge spacing, although ordinarily in the distinct minority, are by no means negligible. To the contrary they are extremely important in successful practice of my invention I have found experimentally that if such cases are neglected the resulting ambiguity of displacement direction—and gross errors in implied character of the candidate print—are often catastrophic to recognition of the authorized user.

The new complex variable resulting from this demodulation (multiplication) step may be represented so:

$$exp\ \{i.(distortion\ field).(wavenumber\ field)\}+noise,$$

in which "exp" means the exponential function, and "distortion field" is the unknown random field 45 quantified statistically by the a priori data 17.

The factor "wavenumber field" represents the same known vector wavenumber field 29' used earlier in constructing the quadrature form of the template. The additive term designated "noise" corresponds to the residual effects of all features of the candidate data that do not represent the local sinusoid associated with the ridges and troughs of the candidate user's skin pattern.

The immediate object of the inquiry is to determine the distortion field. As can be seen, the "noise" term obscures the desired answer.

If one wishes to find the true answer it is very desirable to at least make some allowance for the full expression, including the "noise" term, presented just previously—since that full expression is the quantity which has been found through the demodulation process. The preferred embodiment does makes allowance for the measurement noise by downweighting the demodulation locally, in general proportion to local noisiness in the data—or, in other words, by discounting information from regions known to be noisy.

Of course it would be a great deal easier, in a manner of speaking, to simply use a "fitted" phase without regard to any distortion field or wavenumber field—that is to say, a phase which appears to account for observed mismatches between template and candidate, but is not too large. Doing so, however, would be in a sense somewhat analogous to the "allowing" of some plausible amount of translational wandering or rotation in the method of Driscoll, discussed earlier.

It would be very hard to say, based upon any reasoning from first principles, how to constrain such a fitting, or in other words just what "not too large" means. This is analogous to the problem noted earlier, relative to the Driscoll system, of establishing how much translation or rotation is plausible and how much is simply letting in more candidate users.

One of the particular benefits of the present invention is that it enables estimation of an actual distortion field that is consistent with (1) the assumption that the candidate user is the authorized user, and (2) a term "noise" that corresponds to measurement noise in the candidate data, and (3) an additional noise term representing a magnitude and degree of smoothness, in the distortion, which is not only plausible and not only "not too large" but actually statistically likely as quantified in relation to the a priori statistics.

Thus by approaching the phase-field or distortion-field determination from this seemingly roundabout direction the present invention places the relevant relationships in a form that is amenable to direct use of known variabilities in fingerprint placement. The entire verification process is thereby placed on a footing which is far more solid and physically meaningful than ever possible heretofore.

It remains, however, to say how the distribution field can be extracted from the expression presented above. This is by no means a trivial exercise, as it calls for, in effect, inverting a matrix which is multidimensional—more specifically, having as many dimensions as there are downsampled 43 data points to be used.

Downsampling for tractable processing—Thus extraction of the distortion field involves extremely intensive processing. If it were necessary to perform such procedures at full resolution, which is to say on the entire received data set 14" after the first downsampling 13', the required processing time would be prohibitive in most routine uses. With presentday limitations of processing speed it can only be rendered feasible through a two-part "smoothing and second downsampling" stage 43.

Of the two parts of this stage 43, the one that may be regarded as the more fundamental is the second downsampling, to reduce by an additional large factor the amount of data to be thus intensively processed.

The earlier downsampling 13' was justified on the basis that the data was represented in periodic terms, and that use of sampling intervals much smaller than the smallest period represented in the template could only produce redundant data. Like reasoning applies to the distortion field, but the latter is assumed to change far more slowly—an order of magnitude more slowly—than the elevation changes corresponding to the basic ridge-and-groove pattern.

Fortunately the desired distortion field as a practical matter is almost always a relatively smooth pattern. It is most typically a differential dilation—such as may be expected from pressing some parts of a fingertip more forcefully than others.

In some cases it may also, or instead, partake of a relatively gentle twisting, such as a "C" or sometimes "S" curve—and much more rarely with an abrupt near-discontinuity, such as mentioned above in connection with the need to resort to second or third local subsets 31' in the global search.

Consequently a much smaller amount of candidate data, sampled systematically from the filtered candidate data 14, 14" after demodulation 42 suffices to define the distortion field. Thus it is again reasonable to eliminate merely redundant data by downsampling 43 to a much longer sampling interval than used in the first downsampling 13'.

In the very occasional case of a considerably more abrupt form of distortion, just mentioned, the distortion is so abrupt that it can be treated as an entirely different case—a near-discontinuity, e. g. a very severe local distortion of the skin in a particular region.

As indicated previously, however, my invention is able to deal successfully with such cases. It first avoids them in selection of template subsets 31' for the global search; and it later successfully matches other very large areas of the print, in the final comparison 51.

This is a major advantage of the use of essentially all available data, data drawn from an entire print—as mentioned earlier—rather than only isolated regions. Earlier systems, even relatively sophisticated ones such as Driscoll's and Denyer's, typically are quite unable to verify an authorized user when one or more of the most distinctive regions happen to be disturbed in this way.

It is believed in some quarters that an actual folding of the skin can occur, giving rise to an actual discontinuity in the ridge pattern in a particular region. No amount of continuous distortion can be used to approximate closely such a violent event, if indeed such events occur, in which some portions of the skin pattern typically are actually removed completely from visibility. It is contemplated, however, that the procedure of the present invention is reasonably robust and so can deal with even such extreme cases.

In this second downsampling it is permissible either to downsample from the first downsampled data 14 as illustrated, or to downsample from the fuller data set 13. The former, however, will be much faster.

In choosing the second downsampling interval, care should be taken to avoid inadvertently, implicitly limiting the degree and character—e. g., abruptness—of distortion taken to be present. As suggested above, such arbitrary limitation without physical basis can skew the results.

Limits on distortion should arise from the model in use—specifically, by downsampling at sampling intervals which are related to a measure of the local rate of relative change of phase in the data. This measure conveniently should correspond to the highest significant spatial frequencies in typical or representative distortion fields for real cases.

Such information is contained in the statistical a priori data 17. Therefore, to obtain such a measure, the preferred embodiment first extracts from the a priori statistics 17 an estimate 18" of the power spectral density for distortion fields generally (in other words, not from the candidate data 11 or template 21). It then sets the sampling intervals, as a function of position, in accordance with that estimate 18" of power spectral density.

Bandpassing was used in preparation for the first downsampling 13'—not only for control of noise as such but also specifically to avoid downsampling to nonrepresentative data points. Similarly it is desirable to smooth the data before the downsampling procedure.

This smoothing is the other, and perhaps the less fundamental, of the two parts of the "smoothing and downsampling" stage 43 mentioned above. In the preferred embodiment it is implemented as a low-pass (Fourier) filter—realized with Fast Fourier Transforms. Preferably the smoothing is done as a convolution—with a fixed window in Fourier space—in close conjunction with the second downsampling.

Estimation of the distortion field: gradient search—My invention here uses once again an approach that depends upon manipulation of the overall pattern. Here the pattern is considered as a matrix, and the best-fit distortion field is sought by an iterative approach.

This approach in effect tests the improvement in fit found by initially assuming a distortion field, sequentially making many small changes in that field—at each point assessing the results in terms of quality of fit—and then redirecting subsequent changes accordingly. At each point the assumed field is modified in a direction which the processing results up to that point suggest will further improve the fit.

This iterative approach is somewhat akin to finding the summit of a hill by probing at each point for an uphill slope, and then following that uphill slope a short distance to the next test point. In fact the gradient of a quality-of-fit function is used in this process.

The "gradient search" 44 used in my invention, however, is multidimensional. In other words the "hill" is assumed to be a peak in quality-of-fit space, and this space has a number of "dimensions" equal to the number of data points in use—in other words, even after the downsampling described above, typically some thousands of dimensions.

In the progressive approach to finding the best fit, it is particularly crucial to avoid taking individual steps that are too large. Apart from the relatively straightforward hazard of overshooting the peak (which can be correctable in later steps if they are not too large), a much more insidious kind of error arises from excessively long steps.

As mentioned earlier, many realizations of skin patterns are subject to distortions which amount, locally, to more than a half wavelength or even one or more full wavelengths in the pattern. If such a distortion is allowed to develop too rapidly, the only portion of it which is in effect "visible" is the fractional part remaining after deduction of an integral number of wavelengths.

It is essential to realize that correlation goes to zero in any region of the template that is misaligned by only a quarter of a wavelength. Hence, avoiding errors of a half wavelength, or of course anything larger than that, is of extremely great importance to successful practice of my invention—at least in those cases where sizable distortions are in fact present.

(Dealing with experimental subjects who may develop helpful habits, for example gentleness in applying fingertips to sensors, can actually seduce an algorithm designer into a trap of complacency with respect to these larger distortions. In uncontrolled use of the invention of course no such delicate behavior can be assumed.)

Scaling of the steps to avoid falling into such ambiguities is preferably achieved by limiting the algorithm's rate of propagation—in the spatial or frequency domain, or preferably both—outward from the initially small region of close match ensured by the global search 32–37. Thus the search 44 for an estimation of the distortion field begins in a tightly defined region about a distinctive point in the template, and it is allowed to expand slowly stepwise.

The permissible expansion rate depends on ability to extrapolate judiciously from previous distortions. In the preferred embodiment the expansion or extrapolation steps are related to the intervals previously established for use in the second downsampling 43.

Computational burdens in the gradient search are borne by Fast Fourier Transforms, which are very efficient. The procedure continues until the window has expanded to the whole field.

Isolation and use of the distortion field—The iterations of the gradient search 44 lead to definition of an estimated distortion field 45. This field 45 next is subjected to an intermediate upsampling step 46, through interpolation—preparatory to use in the distortional or nonisomorphic adjustment 25. This distortional adjustment 25 will form a twice-adjusted template 26, which should provide the fairest possible final comparison 51 with the candidate data 14.

The intermediate upsampling step 46 is necessary because the distortion field 45 was developed on a very coarse grid due to the second downsampling 43, but the twice-adjusted template 26 must be made available at full resolution. More specifically, it is needed at generally the same sampling as established on the candidate-data side in the first downsampling 13'.

Accordingly, what is read out to the distortion-adjustment step 25 is an upsampled version 47 of the field 45; it is this upsampled version 47 which is applied 25 to the once-adjusted template 24. The application 25 step is done by multiplying together the two complex-valued fields template' 24 and exp {i distortion field).(wavenumber field)}, and retaining only the real part of the result.

The resulting twice-adjusted template 26 should provide the best possible likelihood of a match with the candidate data 14—if the candidate is in fact the authorized user. If not, then as suggested earlier the greatest likelihood is that the twice-adjusted template 26 will bear little relation to the candidate data 14.

Final comparison, thresholding and decision—The twice-adjusted template 26 and the once-downsampled candidate data 14 are then compared 51. This is done by multiplying them together and summing over the image, subject to inverse weighting 16 based on the candidate-image noise variance estimates 15. In this process the twice-adjusted template 26, with the associated twice-adjusted quadrature forms 26' and twice-adjusted wavenumber field 29", constitute and are used as a matched filter. The result of the filter process 51 is used to form a major part of the test statistic 52.

The latter is preferably formed according to the Neyman-Pierson analysis as a ratio of the likelihoods of occurrence of the processed candidate print data according to two contrary hypotheses—namely, that the authorized user (1) was and (2) was not the maker of the candidate print. Based on this "likelihood-ratio" procedure, the above-mentioned test statistic 52 also incorporates noise statistics 18, once again providing an opportunity to ground the results in solid reality by applying the a priori statistics 17 for the distortion field.

(As a practical matter, for easier management of ratios spanning a very large range of values I prefer to employ the logarithm of the ratio. This variant is sometimes called a "log-likelihood-ratio" method, which is in turn familiarly abbreviated to "log-likelihood" method.)

As explained earlier, these data are "a priori" in the sense of not being derived from either the candidate print or the authorized-user template. They are not, however, "a priori" in the sense of being derived from first principles; rather, these data are collected empirically. (In particular there appears no indication that Driscoll takes into account any such considerations as the a priori term.)

One particularly beneficial property of the Neyman-Pierson approach is that assessment of the two above-mentioned contrary likelihoods is straightforward. These correspond rather directly to the probabilities of false negatives and false positives, respectively.

In a representative Neyman-Pierson diagram, not particularly associated with the present invention, a composite test statistic T (FIG. 6) represents a log-likelihood parameter such as mentioned above. The two generally bell-shaped curves 81, 82 at left and right represent the probabilities of two mutually inconsistent hypotheses.

To relate this graph to the general field of fingerprint verification, for example, the curves 81, 82 might represent the probabilities that a particular print was formed by, respectively, an impostor and the authorized user. A diagram of this sort depends strongly on many different experimental facts, particularly including the amount of noise or experimental error in the system.

The vertical line near the intersection of the two curves represents selection of a particular threshold value $T_T$ of the test statistic T. The shaded area 83 extending leftward from that line, under the left end or tail of the right-hand curve 82, represents the probability of a false rejection of the authorized user—or in other words, as it is sometimes called, a "type 1" error.

The shaded area 84 extending rightward from that same vertical line $T_T$, under the right end or tail of the left-hand curve 81, represents the accumulated probability of an erroneous acceptance of an impostor—a false acceptance, or a "type 2" error. As will be apparent, the relative sizes of these two types of errors can be adjusted by sliding the threshold or discriminator $T_T$ to left or right.

This very general diagram is characteristic of a great many kinds of processes, and as can be seen the two areas 83, 84 representing erroneous decisions each are here arbitrarily drawn as amounting to a few percent, perhaps as many as eight or ten percent, of the respective overall areas 85, 86 under the two curves 81, 82. That general range of numbers appears to be representative of, or perhaps better than, the state of the art in automatic fingerprint verification apparatus and methods heretofore.

My invention enables both evaluation and quantitative control of these two kinds of undesirable result 83, 84 quite readily. As a result of preliminary work—with expectably some further improvement yet to be made—the overlap region 83'+84' (FIG. 7) between the two probability distributions 81', 82' is reduced to a small fraction of one percent.

In relation to the present invention, the test statistic T can now be identified with the like-entitled block 52 in FIG. 1 (see at right in FIG. 7), and the selected threshold $T_T$ similarly identified with the threshold 53 of FIG. 1 gsee at center in FIG. 7). As will be recalled, the desired-certainty threshold 27 is set during preprocessing 58 to accord with not only the authorized user's preferences as to type of error least acceptable, but more quantitatively that user's preferred relative balance or tradeoff between the magnitudes of the two types of errors.

The improvement provided by my invention is so great that it would be difficult to draw the two entire curves 81', 82' at such a scale that the overlap regions 83', 84' could be clearly seen in the same view (as the corresponding much larger regions 83, 84 are seen in FIG. 6). Characteristic error probabilities 83', 84' with my invention as developed at this writing are in the neighborhood of 0.001, or one-tenth percent.

This means that at worst, with the test statistic threshold $T_T$ set at an optimum point within the overlap region either the false-negative or false-positive rate may be a maximum of that same fraction of one percent. If the test statistic $T_T$ is offset from that optimum point, however, then the particular kind of error of greatest concern to the authorized user can be made much smaller than that fraction of a percent.

For instance, the threshold $T_T$ can be set well above the absolute optimum point, in response to a decision by the authorized user to favor false negatives 83' (as for example to give particularly high protection against improper use by family members). The probability of a false positive 84' is thereby easily made a much smaller fraction of one percent, for example 0.01 percent, at the cost of, say, a one-percent incidence of false negatives 83'.

Almost as important as the low value of the false-negative and false-positive probabilities at their crossover point is the fact that this crossover probability can be specified. In fact the probability of a false positive for any particular setting of the threshold 53 can be quantitatively specified, as can the associated probability of a false negative.

Given such information, correlated with the range of settings of the threshold 53, the authorized user is for the first time able to make a fully informed and therefore at least potentially intelligent choice of the desired threshold 27. As mentioned previously, the relationship between selected threshold 27 and actual probabilities, or actual level of desired certainty, is not direct in the sense of a linear or simple mathematical function. The relationship is, however, both monotonic and readily stated in terms of a calibration scale or a tabulation.

Utilization—In operation a candidate user's finger or toe 90—or palm, or any other surface having a comparable skin pattern—is applied to the sensitive surface 91 of a sensor module 92 (FIG. 8D. The system may be programmed to start when a skin pattern is thus applied 57 (see FIG. 1, bottom left) to the sensitive surface, or if desired may be provided with a separate start-up switch (not shown).

The sensor module 92 develops an electronic image 11 (see also FIG. 1). The sensor unit 92 advantageously may be an optical detector array—e. ., one of the types described in the Bowker and Lubard patent document mentioned earlier—or may be any other type that yields a suitable candidate-user image data set 11, for instance a capacitive, variable-resistance, or ultrasonic detector.

I prefer to use an optical-fiber prism as described by Bowker and Lubard. In view of the current economics of large sensors and optical-fiber tapers, however, I currently prefer to use a relay lens (rather than such a taper) to focus the image from the output end of that prism onto a small sensor.

Associated with the sensor module is a read-only memory or ROM (or a programmable ROM, EPROM) 93, which holds the authorized user's template 21, 22 (FIG. 1) and associated data 22", 29—as well as the desired-certainty threshold 27 and the a priori statistics 17. (In FIG. 8 these several callouts are abbreviated "21 &c.") The candidate data 11, template data 21, and related data sets all flow to a programmed or programmable microprocessor or "central processing unit" (CPU) 94. Stored in the ROM 93 or in the CPU 94, or partly in each, is the program described in this patent document.

The portions 91–94 of the apparatus discussed so far— and certain other portions if desired—are advantageously made self-contained and for certain applications also made portable. Accordingly a battery or other portable power supply 95 may be included with the sensor module 92, ROM 93 and CPU 94, and interconnections incorporated, all within a housing 96.

In such a case the output enablement signal 55e (also see FIG. 1) might be the only output from the apparatus. That output passes to access-control module 97, which may include a suitable local or remote switching device for passing an actuation signal 98 to utilization means 99.

The utilization means 99 represent a facility, apparatus, means for providing a financial service, and/or means for providing or receiving information.

Merely by way of example, and without any intent to limit the types of these devices which can be controlled in this way, the utilization means may be and/or may include a cabinet, home, office, military or other governmental installation, educational institution, weapon, computer, vehicle ignition and/or entry, automatic teller machine, credit system, time-and-attendance system, or database information service.

As shown the self-contained unit 96 may provide an enablement or decisional signal 55e to a discrete access-control unit 97. In many systems, however, the access-control module 97 is preferably integrated into the self-contained unit 96—in accordance with security-enhancing integration principles described in the aforementioned document of Bowker and Lubard. Similarly the whole of the print-verifying and access-control devices 96, 97 is advantageously integrated into the utilization means 99.

In both cases the general idea of such integration is to make the security aspects of print-verifying control relatively invulnerable to bypassing. That is to say, integration of the whole system can provide resistance to insertion of a jumper, short, or other form of injected simulated access-control signal 98 at the utilization-means 99 input.

Thus for instance in a weapon, bidirectional information flow between the CPU 94 and a detonator 99 within each projectile (bullet etc.) can prevent tampering with the intermediate firing mechanism. In a vehicle that has a distributor or other ignition module 94 directly associated with the combustion system, automatic exchange of information between the CPU 94 and that ignition module can deter bypassing of the security system.

In a credit, time-and-attendance, or information-dispensing database-access system, similarly, the CPU 94 should be programmed to participate in a dialog with the central computer 94 of the credit etc. system. Such a dialog ideally is conditioned to verify not only the identity of the user but also the integrity of the connection between the CPU 94 and the central system.

In view of the foregoing, further examples will now occur to those skilled in the art.

In the course of experimentation it has been found helpful to exploit some curious phenomena relating to fingertips of some subjects. First, it has been noted that in some people a particular fingertip—including in one case the index finger—cannot yield a usable template.

This appears to be due to diverse causes such as, at one extreme, extraordinarily dry flaky skin, and at the other extreme heavy sweating. Somewhat surprisingly such effects are sometimes localized in just one finger i. e., they involve differential sweating as between different fingers—and so are readily overcome by using a different finger of the same subject.

Although I have observed very little correlation between fingerprints of identical twins, a significant partial correlation appears between different fingers of a single subject. Much lower false-acceptance rates occur if an individual can pass the verification procedures with both of two different fingers; this offers a methodology for reducing type 1 errors, which is intriguing in that it may not adversely affect type 2 errors in like proportion.

The methodology essentially makes use of multiplicative statistics. A related application may reside in the fact that much lower false rejection rates can be achieved where the system is set up for use by either of two fingers.

It will be understood that the foregoing disclosure is intended to be merely exemplary, and not to limit the scope of the invention—which is to be determined by reference to the appended claims.

What is claimed is:

1. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for deriving from the test data corresponding multilevel test data that are bandpassed and normalized;

means for estimating the assumed distortion of the test image relative to a reference image;

means for comparing portions of the bandpassed and normalized multilevel test data with the reference data, taking into account the estimated distortion;

means responsive to the comparing means for making an identity-verification decision; and nonvolatile memory means for holding instructions for automatic operation of the foregoing means.

2. The apparatus of claim 1:

further comprising means for extracting from the test data an estimate of noise variance in the test data as a function of position in the test image; and wherein the estimating means and the comparing means perform said estimating and said comparing, respectively, as a function of position;

wherein the estimating means or the comparing means, or both, comprise means for taking into account the estimated noise variance.

3. The apparatus of claim 1, wherein:

the estimating means comprise means for using a maximum-likelihood method to estimate the distortion field.

4. The apparatus of claim 1, wherein:

the estimating means comprise means for demodulating the test data preliminary to extracting a distortion field therefrom.

5. The apparatus of claim 1, wherein the estimating means comprise:

the estimating means comprise means for avoiding errors due to phase shifts greater than half the local periodicity of the assumed carrier field.

6. The apparatus of claim 1, wherein the estimating means comprise:

means for providing an assumed carrier field for use in demodulating the test data;

means for analyzing the demodulated test data to approximately ascertain distortion associated with the demodulated test data.

7. The apparatus of claim 1, wherein:

the estimating means comprise means for downsampling the test data according to anticipated degree of abruptness of at least one type of distortion, in preparation for estimating the distortion.

8. The apparatus of claim 7:

wherein the estimating means comprise means for downsampling the test data before estimating the distortion;

further comprising means for applying the estimated distortion to approximately equalize the test and reference data with respect to the assumed distortion;

further comprising means for interpolating the estimated distortion, to upsample the estimated distortion for use in the applying means; and wherein the comparing means compare the thus-approximately-equalized test and reference data.

9. The apparatus of claim 1, wherein:

the estimating means comprise means for using a gradient search to estimate the distortion.

10. Apparatus for verifying the identity of a person by literally and directly comparing a test data set representing a two-dimensional test image of that person's skin-pattern print with a reference data set derived from a two-dimensional reference skin-pattern print image obtained during a prior enrollment procedure; said apparatus being for use in the presence of an assumed geometrical distortion of the test image relative to the reference image; and said apparatus comprising:

means for estimating the assumed geometrical distortion of the test image relative to a reference image;

means for literally and directly applying the estimated distortion to approximately equalize the test and reference data sets with respect to the assumed geometrical distortion;

means for literally and directly comparing the test data set with the reference data set, taking into account the estimated geometrical distortion;

wherein the comparing means literally and directly compare at least major fractions of the thus-approximately-equalized test and reference data sets themselves, as distinguished from individual very small subarrays thereof, and also as distinguished from mere measures of correlation between the sets, and also as distinguished from mere measures of distortion of one or both sets;

means responsive to the comparing means for making an identity-verification decision; and nonvolatile memory means for holding instructions for automatic operation of the foregoing means.

11. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image;

means for comparing the test data with the reference data, taking into account the estimated distortion;

means responsive to the comparing means for making an identity-verification decision;

means for applying the estimated distortion to approximately equalize the test and reference data with respect to the assumed distortion; and wherein:

the comparing means compare the thus-approximately-equalized test and reference data; and the applying and comparing means comprise means for using the estimated distortion to generate a matched filter for use in forming a test statistic; and further comprising nonvolatile memory means for holding instructions for automatic operation of the foregoing means.

12. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image;

means for comparing the test data with the reference data, taking into consideration the estimated distortion;

means responsive to the comparing means for making an identity-verification decision; and means for extracting from the test data an estimate of noise variance in the test data as a function of position in the test image; and wherein:

the estimating means and the comparing means perform said estimating and said comparing, respectively, as a function of position;

the estimating means or the comparing means, or both, comprise means for taking into account the estimated noise variance; and the taking-into-account means comprise means for weighting the importance of the estimating or comparing, or both, as a function of position in accordance with the noise variance estimate for the corresponding position; and further comprising nonvolatile memory means for holding instructions for automatic operation of the foregoing means.

13. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image; wherein said estimating means comprise:

means for using a maximum-likelihood method to estimate the distortion field, and means for using the maximum-likelihood-estimated distortion field to generate a matched filter for use in forming a test statistics;

means for comparing the test data with the reference data, taking into account the estimated distortion;

means responsive to the comparing means for making an identity-verification decision; and nonvolatile memory means for holding instructions for automatic operation of the foregoing means.

14. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image;

means for comparing the test data with the reference data, taking into account the estimated distortion;

means responsive to the comparing means for making an identity-verification decision; and wherein:

the estimating means comprise means for using a maximum-likelihood method to estimate the distortion field; and said using means comprise means for taking account of a priori statistics in estimating the distortion field; and further comprising nonvolatile memory means for holding instructions for automatic operation of the foregoing means.

15. The apparatus of claim 14, wherein:

said using means comprise means for using a Fourier-space model for taking account of the a priori statistics.

16. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image;

means for comparing the test data with the reference data, taking into account the estimated distortion;

means responsive to the comparing means for making an identity-verification decision; and wherein the estimating means comprise:

means for demodulating the test data preliminary to extracting a distortion field therefrom, and means for applying information developed from the reference data as a carrier field, in demodulating the test data; and further comprising nonvolatile memory means for holding instructions for automatic operation of the foregoing means.

17. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image;

wherein the estimating means comprise:

means for avoiding errors due to phase shifts greater than half the local periodicity of an assumed carrier field, and means for beginning the estimating with a first approximation that is localized and of small magnitude, and iterating so that progressive approximations propagate in the frequency or spatial domain, or both; and the avoiding means comprise means for controlling rate of propagation to minimize likelihood of introducing a phase shift greater than half the local periodicity in any single iteration; and further comprising:

means for comparing the test data with the reference data, taking into account the estimated distortion;

means responsive to the comparing means for making an identity-verification decision; and nonvolatile memory means for holding instructions for automatic operation of the foregoing means.

18. The apparatus of claim 17, wherein the controlling means comprise:

means for monitoring a measure of the rate at which the distortion is changing; and means, responsive to the monitoring means, for limiting the rate of propagation as a function of position, in accordance with said measure.

19. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image;

wherein the estimating means comprise means for downsampling the test data according to anticipated degree of abruptness of at least one type of distortion, in preparation for estimating the distortion;

means for comparing the test data with the reference data, taking into account the estimated distortion;

means responsive to the comparing means for making an identity-verification decision;

means for extracting from prior statistics an estimate of the power spectral density for distortion fields generally;

means for setting sampling intervals as a function of position, in accordance with the estimate of power spectral density; and nonvolatile memory means for holding instructions for automatic operation of the foregoing means.

20. A secured system subject to access control based upon surface-relief data from a relieved surface such as a finger; said system being for use in the presence of an assumed distortion of the relieved surface; and said system comprising:

utilization means, susceptible to misuse in the absence of a particular such relieved surface that is related to an authorized user, said utilization means being selected from the group consisting of:

a facility, apparatus, means for providing a financial service, and means for providing or receiving information;

sensor means for acquiring surface-relief data from such a relieved surface;

means for processing the data to determine identity of the relieved surface, and for applying the determined identity to control access to the utilization means, said processing and applying means including:

means for expressing the test data in the form of local sinusoids;

means for expressing reference data, related to said particular relieved surface related to the authorized user, in the form of local sinusoids;

means for analyzing the data to estimate the assumed distortion, means for comparing portions of the sinusoidally expressed test data with the sinusoidally expressed reference data related to said particular relieved surface related to the authorized user, taking into account the estimated distortion, and means, responsive to the comparing means, for making an identity-verification decision; and nonvolatile memory means for holding instructions for automatic operation of the foregoing means.

21. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image;

means for comparing the test data with the reference data, taking into account the estimated distortion;

means for extracting from the test data an estimate of noise variance in the test data as a function of position in the test image;

wherein the estimating means or the comparing means, or both, comprise means for weighting the importance of the estimating or comparing, or both, as a function of position in accordance with the noise-variance estimate for the corresponding position;

means responsive to the comparing means for making an identity-verification decision; and nonvolatile memory means for holding instructions for automatic operation of the foregoing means.

22. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating the assumed distortion of the test image relative to a reference image; wherein said estimating means comprise means for using a maximum-likelihood method to estimate the distortion field and thereby generate a matched filter for use in forming a test statistic;

means for comparing the reference data with the test data, using the test statistic;

means responsive to the comparing means for making an identity-verification decision; and nonvolatile memory means for holding instructions for automatic operation of the foregoing means.

23. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for using a maximum-likelihood method that takes account of a priori statistics, to estimate the assumed distortion of the test image relative to a reference image;

means for comparing the test data with the reference data, taking into account the estimated distortion;

means responsive to the comparing means for making an identity-verification decision; and nonvolatile memory means for holding instructions for automatic operation of the foregoing means.

24. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for applying information developed from the reference data as a carrier field, to demodulate the test data;

means for estimating the assumed distortion of the demodulated test image relative to a reference image;

means for comparing the test data with the reference data, taking into account the estimated distortion;

means responsive to the comparing means for making an identity-verification decision; and further comprising nonvolatile memory means for holding instructions for automatic operation of the foregoing means.

25. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image, said assumed distortion being superimposed on an assumed carrier field; and said apparatus comprising:

means for estimating the assumed distortion of the test image relative to a reference image;

means for estimating or establishing the assumed carrier field;

means for detecting phase discontinuities or reversals in the skin-pattern print image, to avoid skin-pattern phase shift greater than half the local periodicity of the assumed carrier field;

means for comparing the test data with the reference data, taking into account the estimated distortion substantially free of effects of such skin-pattern phase shift greater than half the local periodicity of the assumed carrier field;

means responsive to the comparing means for making an identity-verification decision; and nonvolatile memory means for holding instructions for automatic operation of the foregoing means.

26. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for establishing a first approximation of the assumed distortion, said first approximation being localized and of small magnitude;

means for establishing further approximations iteratively so that progressive approximations propagate in the frequency or spatial domain, or both, to thereby estimate the overall distortion of the test image relative to a reference image;

means for controlling rate of propagation to minimize likelihood of introducing, in any single iteration, a phase shift greater than half the local periodicity of an assumed carrier field; and further comprising:

means for comparing the test data with the reference data, taking into account the estimated distortion;

means responsive to the comparing means for making an identity-verification decision; and nonvolatile memory means for holding instructions for automatic operation of the foregoing means.

27. Apparatus for verifying the identity of a person by comparing test data representing a two-dimensional test image of that person's skin-pattern print with reference data derived from a two-dimensional reference skin-pattern print image obtained during a prior enrollment procedure; said apparatus being for use in the presence of an assumed distortion of the test image relative to the reference image; and said apparatus comprising:

means for estimating power spectral density of skin-pattern print data;

means for downsampling the test data according to anticipated degree of abruptness of at least one type of distortion;

means for employing the estimated power spectral density in estimating the assumed distortion of the downsampled test image relative to a reference image;

means for comparing the test data with the reference data, taking into account the thereby-estimated distortion;

means responsive to the comparing means for making an identity-verification decision; and nonvolatile memory means for holding instructions for automatic operation of the foregoing means.

\* \* \* \* \*